US012779696B2

(12) United States Patent
Oberoi et al.

(10) Patent No.: US 12,779,696 B2
(45) Date of Patent: Nov. 3, 2026

(54) NORMALIZING NOSEPIECE ASSEMBLY FOR AN END EFFECTOR

(71) Applicants: The Boeing Company, Arlington, VA (US); Korean Air Lines Co., Ltd., Seoul (KR)

(72) Inventors: Harinder Singh Oberoi, Snohomish, WA (US); Kevin M. Barrick, Kingston, WA (US); Yuanxin Charles Hu, Newcastle, WA (US); Melissa A. Johnson, Puyallup, WA (US); Laura Carolyn Foster, Brier, WA (US); Gi Jun Hong, Busan (KR); Hwangyu Shin, Gyeongsangnam-do (KR); Youngwoo Koh, Busan (KR)

(73) Assignees: The Boeing Company, Arlington, VA (US); Korean Airlines Co., Ltd, Seoul (KR)

( * ) Notice: Subject to any disclaimer, the term of this patent is extended or adjusted under 35 U.S.C. 154(b) by 457 days.

(21) Appl. No.: 18/447,610

(22) Filed: Aug. 10, 2023

(65) Prior Publication Data

US 2024/0066709 A1 Feb. 29, 2024

Related U.S. Application Data

(60) Provisional application No. 63/373,309, filed on Aug. 23, 2022.

(51) Int. Cl.

| | |
|---|---|
| ***B25J 9/00*** | (2006.01) |
| ***B25J 9/16*** | (2006.01) |
| ***B25J 15/04*** | (2006.01) |
| ***F16C 32/04*** | (2006.01) |

(52) U.S. Cl.
CPC ............ *B25J 9/1694* (2013.01); *B25J 15/04* (2013.01); *F16C 32/0406* (2013.01)

(58) Field of Classification Search
CPC ....... B25J 15/04; B25J 9/1694; F16C 32/0406
See application file for complete search history.

(56) References Cited

U.S. PATENT DOCUMENTS

| | | | | |
|---|---|---|---|---|
| 8,496,416 | B1 * | 7/2013 | Fischer | B25J 15/0019 408/141 |
| 8,573,070 | B2 * | 11/2013 | Sarh | B25J 13/086 901/34 |
| 9,440,284 | B2 * | 9/2016 | Sarh | B21J 15/32 |
| 10,661,449 | B2 * | 5/2020 | Zachary | B23B 31/30 |
| 10,723,484 | B2 * | 7/2020 | Chan | B21J 15/022 |

(Continued)

FOREIGN PATENT DOCUMENTS

| | | | | |
|---|---|---|---|---|
| CN | 104622583 B | * | 10/2017 | A61B 34/76 |
| CN | 221517888 U | * | 8/2024 | |
| DE | 202013003510 U1 | * | 4/2013 | B25J 15/0441 |

(Continued)

*Primary Examiner* — Jamel E Williams
(74) *Attorney, Agent, or Firm* — Yee & Associates, P.C.

(57) ABSTRACT

An end effector is presented. The end effector comprises a housing, an actuated mechanical retainer, and a normalizing nosepiece assembly. The actuated mechanical retainer is connected to the housing and configured to selectively constrain and release the normalizing nosepiece assembly from the housing. The normalizing nosepiece assembly is moveable relative to the housing and having a nosepiece bushing configured to contact a workpiece.

21 Claims, 26 Drawing Sheets

(56) References Cited

U.S. PATENT DOCUMENTS

| | | | | |
|---|---|---|---|---|
| 11,014,314 | B2 * | 5/2021 | Anderson | B29C 70/541 |
| 2017/0225339 | A1 * | 8/2017 | Kerestes | B25J 15/0441 |

FOREIGN PATENT DOCUMENTS

| | | | | |
|---|---|---|---|---|
| EP | 3202541 B1 * | 11/2019 | | B25J 15/0441 |
| WO | WO-2014161656 A1 * | 10/2014 | | B25J 19/0045 |
| WO | WO-2023150088 A1 * | 8/2023 | | B25J 11/0095 |

* cited by examiner

NORMALIZING NOSEPIECE ASSEMBLY FOR AN END EFFECTOR

CROSS-REFERENCE TO RELATED APPLICATION

This application claims the benefit of U.S. Provisional Patent Application Ser. No. 63/373,309, filed Aug. 23, 2022, and entitled "Normalizing Nosepiece Assembly for an End Effector," which is incorporated herein by reference in its entirety.

BACKGROUND INFORMATION

1. Field

The present disclosure relates generally to robotic end effectors and more specifically to normalizing end effectors relative to a workpiece.

2. Background

Robotic end effectors are used to perform operations such as drilling, fastener installation, inspection, surface preparation, or other operations on workpieces during manufacturing. Robotic end effectors are first normalized relative to the workpiece prior to performing an operation on the workpiece. Normalizing an end effector can be more difficult than desired. Conventional normalizing components can be more complicated than desired or limited in application.

Therefore, it would be desirable to have a method and apparatus that takes into account at least some of the issues discussed above, as well as other possible issues. For example, it would be desirable to present a normalizing assembly that addresses the issues discussed above.

SUMMARY

An embodiment of the present disclosure provides an end effector. The end effector comprises a housing, an actuated mechanical retainer, and a normalizing nosepiece assembly. The actuated mechanical retainer is connected to the housing and configured to selectively constrain and release the normalizing nosepiece assembly from the housing. The normalizing nosepiece assembly is moveable relative to the housing and having a nosepiece bushing configured to contact a workpiece.

Another embodiment of the present disclosure provides a method of normalizing an end effector relative to a workpiece. A normalizing nosepiece assembly of an end effector is released from a housing of the end effector. A surface of the workpiece is contacted with a rigid component of the normalizing nosepiece assembly while released from the housing. A change in an air gap within the normalizing nosepiece assembly is determined while the rigid component of the normalizing nosepiece assembly is in contact with the surface. The housing of the end effector is aligned with the normalizing nosepiece assembly based on the change in the air gap. The housing of the end effector is secured relative to the normalizing nosepiece assembly.

Yet another embodiment of the present disclosure provides a method for normalizing an end effector using a normalizing nosepiece assembly. Distances of a first flange from a second flange of a normalizing nosepiece assembly are determined at a number of locations within an air gap of the normalizing nosepiece assembly. Two planes are calculated using the distances of the first flange from the second flange. Normal vectors for the two planes are determined. A cross of the two normal vectors is taken to determine a compound contour.

Yet another embodiment of the present disclosure provides an end effector. The end effector comprises a housing, a normalizing nosepiece assembly, and an actuated mechanical retainer. The normalizing nosepiece assembly comprises a nosepiece bushing; a compressible contact structure connected to the nosepiece bushing; a magnetic bearing within an air gap between the nosepiece bushing and a bearing housing; and an anti-skid plate connected to the bearing housing. The actuated mechanical retainer is configured to release the normalizing nosepiece assembly from the housing.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
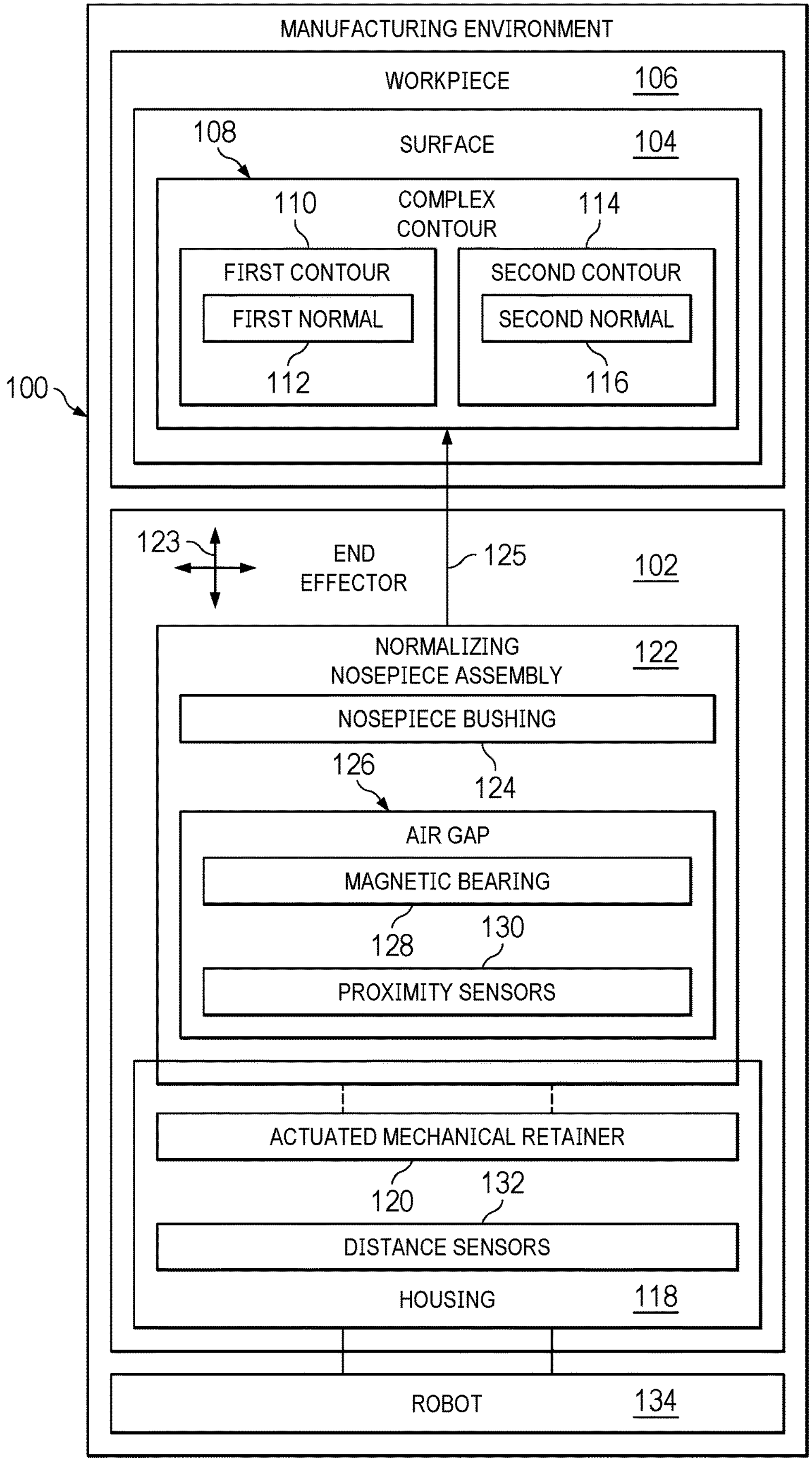
FIG. 1 is a block diagram of a manufacturing environment in which an illustrative embodiment may be implemented.

The illustrative examples recognize and take into account one or more different considerations. For example, the illustrative examples recognize and take into account that in current normalizing assemblies for end effectors can normalize to simple contours. However, the illustrative examples also recognize and take into account conventional normalizing assemblies do not normalize to compound contoured surfaces. The illustrative examples recognize and take into account a forward portion of an aircraft fuselage, including the flight deck or cockpit, has contours that vary in multiple directions. The normal of the contour changes as one travels across the contour. The illustrative examples recognize and take into account that in a complex contour, as you travel the contour on one axis in contrast to another axis, you will have two different contours as one travels.

The illustrative examples recognize and take into account that conventional normalizing assemblies use complex spherical joint hardware in the anti-skidding mechanism. The illustrative examples recognize and take into account that the reliability of the spherical joint hardware in conventional normalizing assemblies can be undesirably low. The illustrative examples recognize and take into account that the spherical joint in conventional normalizing assemblies can have an undesirable amount of maintenance.

Existing normalizing nosepiece assemblies utilize proximity sensors that define a singular plane. The major drawback of this design is that normalization can only happen with respect to simple contours.

The illustrative examples recognize and take into account that conventional normalizing assemblies include mechanical springs. The illustrative examples recognize and take into account that with repeated use, mechanical springs can have at least one of decreased or variable tension. The illustrative examples recognize and take into account that unreliable tension is undesirable.

The illustrative examples recognize and take into account that operations, such as drilling, can be performed by automation in areas where normalization can be performed. The illustrative examples recognize and take into account that it would be desirable to perform normalization in areas of compound contours so that operations can be automated in those areas.

The illustrative examples recognize and take into account that the movement of the robot can be undesirably stiff. The illustrative examples recognize and take into account that due to the movement of the robot, conventional normalizing processes can damage the workpiece. The illustrative examples recognize and take into account that movement of the robot can limit the normalization processes that can be performed.

In the illustrative examples, the normalizing nosepiece assembly of the end effector is disconnected from the robot to normalize the end effector. The illustrative examples provide a normalizing nosepiece assembly capable of normalizing relative to a compound contour.

With reference now to the figures, and in particular, with reference to FIG. 1, a block diagram of a manufacturing environment is depicted in which an illustrative embodiment may be implemented. As depicted, manufacturing environment 100 includes end effector 102. End effector 102 can be normalized to surface 104 of workpiece 106. Surface 104 has complex contour 108. Complex contour 108 has first contour 110 with first normal 112 and second contour 114 with second normal 116.

End effector 102 comprises housing 118, actuated mechanical retainer 120, and normalizing nosepiece assembly 122. Actuated mechanical retainer 120 is connected to housing 118 and configured to selectively constrain and release normalizing nosepiece assembly 122 from housing 118. Normalizing nosepiece assembly 122 is moveable relative to housing 118. Normalizing nosepiece assembly 122 has nosepiece bushing 124 configured to contact workpiece 106. Nosepiece bushing 124 is formed of a rigid material configured not to undesirably interact with the material of workpiece 106. Nosepiece bushing 124 can be referred to as a rigid component. In some illustrative examples, nosepiece bushing 124 is formed of a metallic material.

Normalizing nosepiece assembly 122 comprises air gap 126 that changes shape as normalizing nosepiece assembly 122 moves 123 relative to housing 118. Normalizing nosepiece assembly 122 further comprises magnetic bearing 128 in air gap 126. Normalizing nosepiece assembly 122 further comprises proximity sensors 130 in air gap 126.

End effector 102 further comprises distance sensors 132 mounted to housing 118 and configured to detect movement of at least a portion of normalizing nosepiece assembly 122 relative to housing 118.

End effector 102 is normalized relative to workpiece 106. End effector 102 is normalized using normalizing nosepiece assembly 122. Normalizing nosepiece assembly 122 of end effector 102 is released from housing 118 of end effector 102. Normalizing nosepiece assembly 122 is released by actuated mechanical retainer 120. When normalizing nosepiece assembly 122 is released from housing 118, normalizing nosepiece assembly 122 can move 123 relative to housing 118 within a set range. After releasing normalizing nosepiece assembly 122, surface 104 of workpiece 106 is contacted with normalizing nosepiece assembly 122. A change in air gap 126 within normalizing nosepiece assembly 122 is determined while normalizing nosepiece assembly 122 is in contact 125 with surface 104. The change in air gap 126 can be determined using proximity sensors 130.

Housing 118 of end effector 102 is aligned with normalizing nosepiece assembly 122 based on the change in air gap 126. In some illustrative examples, distance sensors 132 are used to determine a distance components of normalizing nosepiece assembly 122 moved due to contact of normalizing nosepiece assembly 122 with surface 104. In some illustrative examples, data from distance sensors 132 is used in aligning housing 118 with normalizing nosepiece assembly 122. After aligning housing 118 with normalizing nosepiece assembly 122, housing 118 of end effector 102 is secured relative to normalizing nosepiece assembly 122. Housing 118 is secured by actuated mechanical retainer 120.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, any desirable quantity of components are present in normalizing nosepiece assembly 122. In some illustrative examples, normalizing nosepiece assembly 122 comprises a material configured to contact a composite material without undesirably affecting surface 104 of workpiece 106.

Figure 2:
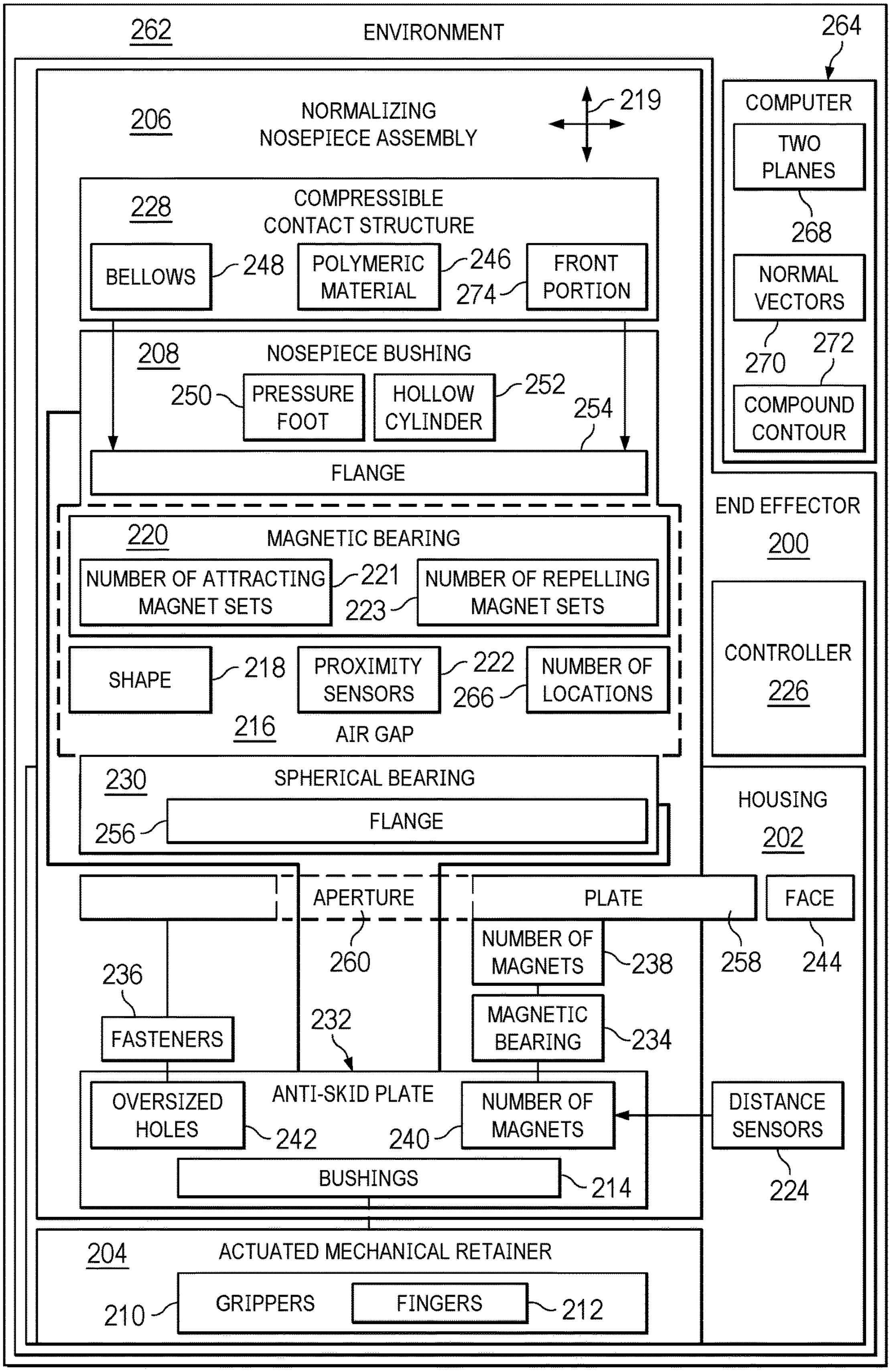
FIG. 2 is a block diagram of an end effector in accordance with an illustrative embodiment.

Turning to FIG. 2, a block diagram of an end effector is depicted in accordance with an illustrative embodiment. End effector 200 is an implementation of end effector 102 of FIG. 1.

End effector 200 comprises housing 202, actuated mechanical retainer 204, and normalizing nosepiece assembly 206. Actuated mechanical retainer 204 is connected to housing 202 and configured to selectively constrain and release normalizing nosepiece assembly 206 from housing 202. Normalizing nosepiece assembly 206 is moveable relative to housing 202 and has nosepiece bushing 208 configured to contact a workpiece (not depicted). Nosepiece bushing 208 is formed of a rigid material configured not to undesirably interact with the material of a workpiece, such as workpiece 106 of FIG. 1. Nosepiece bushing 208 can be referred to as a rigid component. In some illustrative examples, nosepiece bushing 124 is formed of a metallic material configured not to undesirably interact with a composite material.

In some illustrative examples, actuated mechanical retainer 204 comprises grippers 210. Grippers 210 are actuated by retracting or extending fingers 212 of grippers 210. Actuated mechanical retainer 204 comprises any desirable quantity of grippers 210. In some illustrative examples, grippers 210 comprises two grippers. In some illustrative examples, grippers 210 comprises more than two grippers. Each of grippers 210 includes any desirable quantity of fingers.

When actuated mechanical retainer 204 comprises grippers 210, releasing normalizing nosepiece assembly 206 of end effector 200 comprises actuating grippers 210 to release normalizing nosepiece assembly 206. In some illustrative examples, actuating grippers 210 comprises actuating grippers 210 to retract fingers 212 of grippers 210. In some illustrative examples, grippers 210 are positioned within housing 202.

When actuated, mechanical retainer 204 comprises grippers 210 securing housing 202 of end effector 200 relative to normalizing nosepiece assembly 206. In some illustrative examples, actuating grippers 210 of end effector 200 comprises actuating grippers 210 of end effector 200 to extend fingers 212 of grippers 210 to engage with bushings 214 of normalizing nosepiece assembly 206. In some illustrative examples, actuated mechanical retainer 204 comprises grippers connected to housing 202 and extending through bushings 214 of normalizing nosepiece assembly 206.

Normalizing nosepiece assembly 206 comprises air gap 216 that changes shape 218 as normalizing nosepiece assembly 206 moves 219 relative to housing 202. Magnetic bearing 220 and proximity sensors 222 are present in air gap 216. Proximity sensors 222 are configured to measure distances at multiple locations within air gap 216.

Magnetic bearing 220 is configured to moderate movement of components of normalizing nosepiece assembly 206 relative to each other. In some illustrative examples, magnetic bearing 220 comprises number of attracting magnet sets 221 and number of repelling magnet sets 223. Number of attracting magnet sets 221 maintains a desired orientation of nosepiece bushing 208 relative to bearing housing 230. Number of repelling magnet sets 223 provide consistent tension force to maintain air gap 216 between nosepiece bushing 208 and bearing housing 230. Magnetic bearing 220 functions as a spring between nosepiece bushing 208 and bearing housing 230.

End effector 200 further comprises distance sensors 224 mounted to housing 202 and configured to detect movement of at least a portion of normalizing nosepiece assembly 206 relative to housing 202. Data from proximity sensors 222 and distance sensors 224 informs movement of housing 202 prior to securing housing 202 relative to normalizing nosepiece assembly 206. After normalizing nosepiece assembly 206 is in contact 125 with a workpiece, controller 226 uses data from proximity sensors 222 and distance sensors 224 to move housing 202 so that housing 202 is aligned with normalizing nosepiece assembly 206. Housing 202 is moved utilizing the robot (not depicted), such as robot 134 of FIG. 1, connected to end effector 200.

Distance sensors 224 measure the change, how far anti-skid plate 232 of normalizing nosepiece assembly 206 has moved to normalize to a workpiece, and then relay that information back to controller 226 for the robot (not depicted). Controller 226 directs the robot to align with the normal of normalizing nosepiece assembly 206. Once the robot is in alignment, grippers 210 will lock back in engagement with normalizing nosepiece assembly 206.

Normalizing nosepiece assembly 206 comprises nosepiece bushing 208, compressible contact structure 228 connected to nosepiece bushing 208, magnetic bearing 220 within air gap 216 between nosepiece bushing 208 and bearing housing 230, and anti-skid plate 232 connected to bearing housing 230. In some illustrative examples, anti-skid plate 232 is directly connected to bearing housing 230. In some illustrative examples, anti-skid plate 232 is indirectly connected to bearing housing 230 by being connected through another non-depicted component. In some illustrative examples, after aligning housing 230 with normalizing nosepiece assembly 206, grippers 210 of end effector 200 are locked into the anti-skid plate 232 of normalizing nosepiece assembly 206.

In some illustrative examples, grippers 210 are connected to housing 202 and extending through bushings 214 of normalizing nosepiece assembly 206. As depicted, bushings 214 are present in anti-skid plate 232 of normalizing nosepiece assembly 206.

When actuated mechanical retainer 204 has released anti-skid plate 232, anti-skid plate 232 is movable relative to housing 202. When anti-skid plate 232 is movable relative to housing 202, movement of anti-skid plate 232 is moderated by magnetic bearing 234 and fasteners 236.

Magnetic bearing 234 comprises number of magnets 238 connected to housing 202 and number of magnets 240 connected to anti-skid plate 232. Number of magnets 238 and number of magnets 240 form at least one of pairs of magnets having opposite polarity or pairs of magnets having the same polarity. Magnetic bearing 234 prevents anti-skid plate 232 from striking components of housing 202. Pairs of magnets having opposite polarity in magnetic bearing 234 act as a bearing surface to allow normalizing nosepiece assembly 206 to float.

Fasteners 236 extending through anti-skid plate 232 moderate movement of anti-skid plate 232 relative to housing 202. Fasteners 236 extend through oversized holes 242 of anti-skid plate 232. Fasteners 236 are connected to housing 202. In some illustrative examples, fasteners 236 help to maintain orientation of anti-skid plate 232.

In some illustrative examples, portions of normalizing nosepiece assembly 206 are outside of housing 202 while other portions are within housing 202. In some illustrative examples, anti-skid plate 232 is present within housing 202. In some illustrative examples, normalizing nosepiece assembly 206 extends through face 244 of housing 202.

Compressible contact structure 228 is outside of housing 202 and is configured to contact a workpiece (not depicted). Compressible contact structure 228 is configured to contact the workpiece without undesirably affecting the workpiece. In some illustrative examples, compressible contact structure 228 is configured to contact the workpiece without scratching the workpiece. In some illustrative examples, compressible contact structure 228 comprises polymeric material 246. In some illustrative examples, compressible contact structure 228 is bellows 248.

To normalize end effector 200, compressible contact structure 228 is placed in contact with a workpiece. Normalizing nosepiece assembly 206 is released from housing 202. As pressure is applied to compressible contact structure 228, compressible contact structure 228 compresses and nosepiece bushing 208 comes into contact with the workpiece.

Nosepiece bushing 208 can also be referred to as pressure foot 250. Nosepiece bushing 208 comprises hollow cylinder 252 and flange 254. Compressible contact structure 228 is positioned around a portion of hollow cylinder 252 and in contact with flange 254. After normalization of end effector 200, a tool can extend through hollow cylinder 252 to perform an operation on the workpiece. Flange 254 of nosepiece bushing 208 and flange 256 of bearing housing 230 form air gap 216. Flange 254 is a circular flange positioned such that portions of hollow cylinder 252 extend on either side of flange 254.

As depicted, plate 258 forms face 244 of housing 202. In this illustrative example, normalizing nosepiece assembly 206 extends through aperture 260 in plate 258. Compressible contact structure 228 outside of housing 202 and normalizing nosepiece assembly 206 normalizes relative to a workpiece adjacent face 244 of housing 202.

End effector 200 is present within environment 262. In this illustrative example, computer system 264 is also present within environment 262. In some illustrative examples, computer system 264 is utilized in normalizing end effector 200 using normalizing nosepiece assembly 206. In other illustrative examples, controller 226 is utilized in normalizing end effector 200 using normalizing nosepiece assembly 206. In some illustrative examples, measurements from at least one of proximity sensors 222 or distance sensors 224 are sent to computer system 264.

Distances of first flange 254 from second flange 256 of normalizing nosepiece assembly 206 are determined at number of locations 266 within air gap 216 of normalizing nosepiece assembly 206. Two planes 268 are calculated using the distances of first flange 254 from second flange 256. Normal vectors 270 are determined for two planes 268. A cross of normal vectors 270 is taken to determine a compound contour 272. Compound contour 272 is used to align housing 202 of end effector 200 with the normalizing nosepiece assembly 206 based on the change in air gap 216. In some illustrative examples, measurements from distance sensors 224 are also used to align housing 202 of end effector 200 with the normalizing nosepiece assembly 206.

First flange 254 is a portion of nosepiece bushing 208 and second flange 256 is a portion of bearing housing 230. In some illustrative examples, the distances of first flange 254 from second flange 256 are determined using six proximity sensors 222 attached to at least one of first flange 254 or second flange 256.

The illustration of end effector 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, anti-skid plate 232 could be positioned outside of housing 202. As another example, compressible contact structure 228 can be a shape other than bellows 248.

Figure 3:
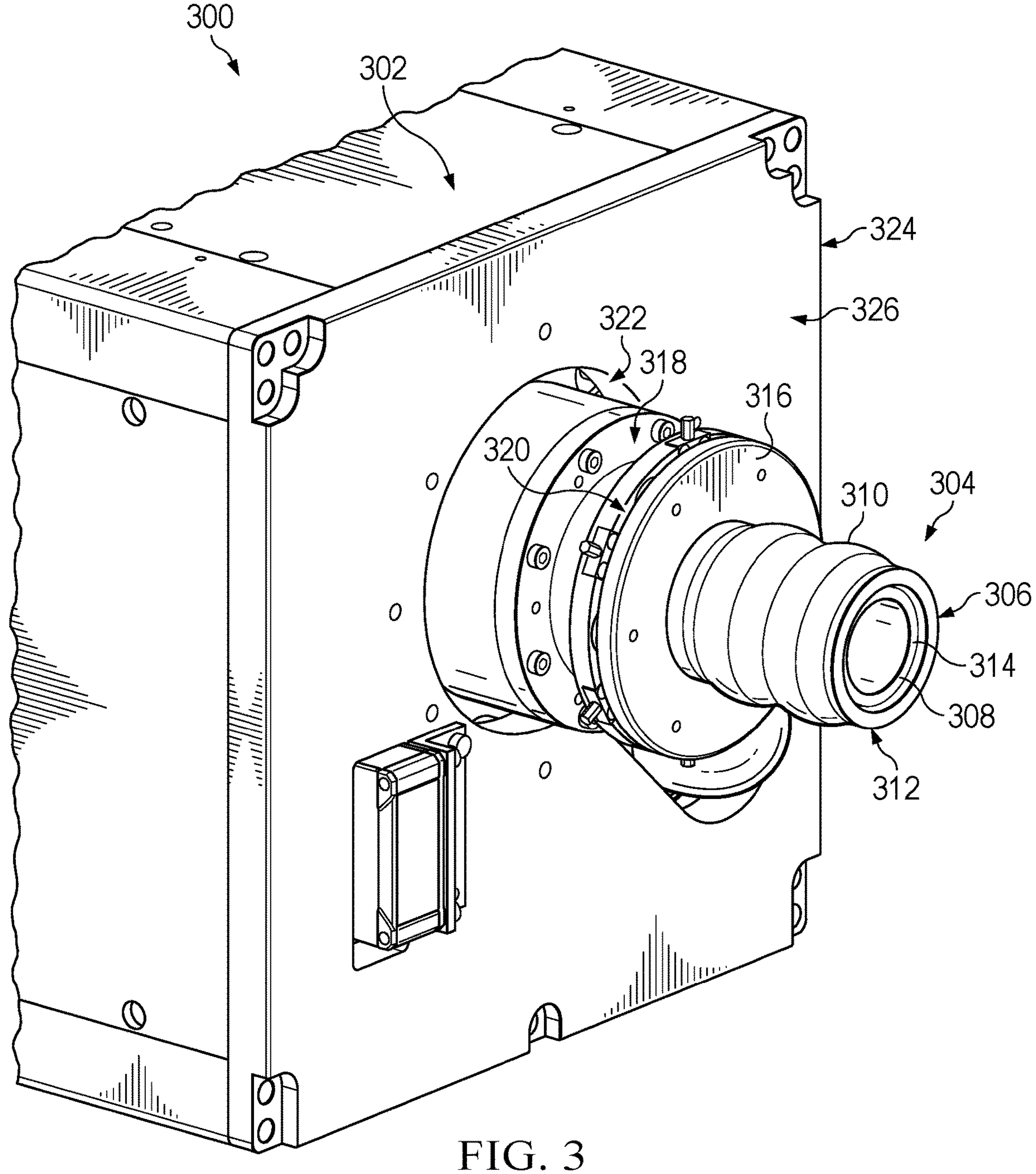
FIG. 3 is an isometric view of an end effector in accordance with an illustrative embodiment.

Turning to FIG. 3, an isometric view of an end effector is depicted in accordance with an illustrative embodiment. End effector 300 is a physical implementation of end effector 102 of FIG. 1. End effector 300 is a physical implementation of end effector 200 of FIG. 2.

End effector 300 comprises housing 302 and normalizing nosepiece assembly 304. Normalizing nosepiece assembly 304 is moveable relative to housing 302 when normalizing nosepiece assembly 304 is released by an actuated mechanical retainer (not depicted).

Normalizing nosepiece assembly 304 has compressible contact structure 306 covering portions of nosepiece bushing 308. Compressible contact structure 306 is configured to contact a surface of a workpiece (not depicted). In this illustrative example, compressible contact structure 306 takes the form of bellows 310 formed of polymeric material 312.

Nosepiece bushing 308 comprises hollow cylinder 314 extending into compressible contact structure 306 and flange 316 separated from bearing housing 318 by air gap 320. Air gap 320 changes when normalizing nosepiece assembly 304 contacts the workpiece.

In this illustrative example, normalizing nosepiece assembly 304 extends through aperture 322 in housing 302. In this illustrative example, aperture 322 extends through plate 324. Plate 324 forms face 326 of housing 302. End effector 300 is normalized to a workpiece positioned adjacent face 326.

Figure 4:
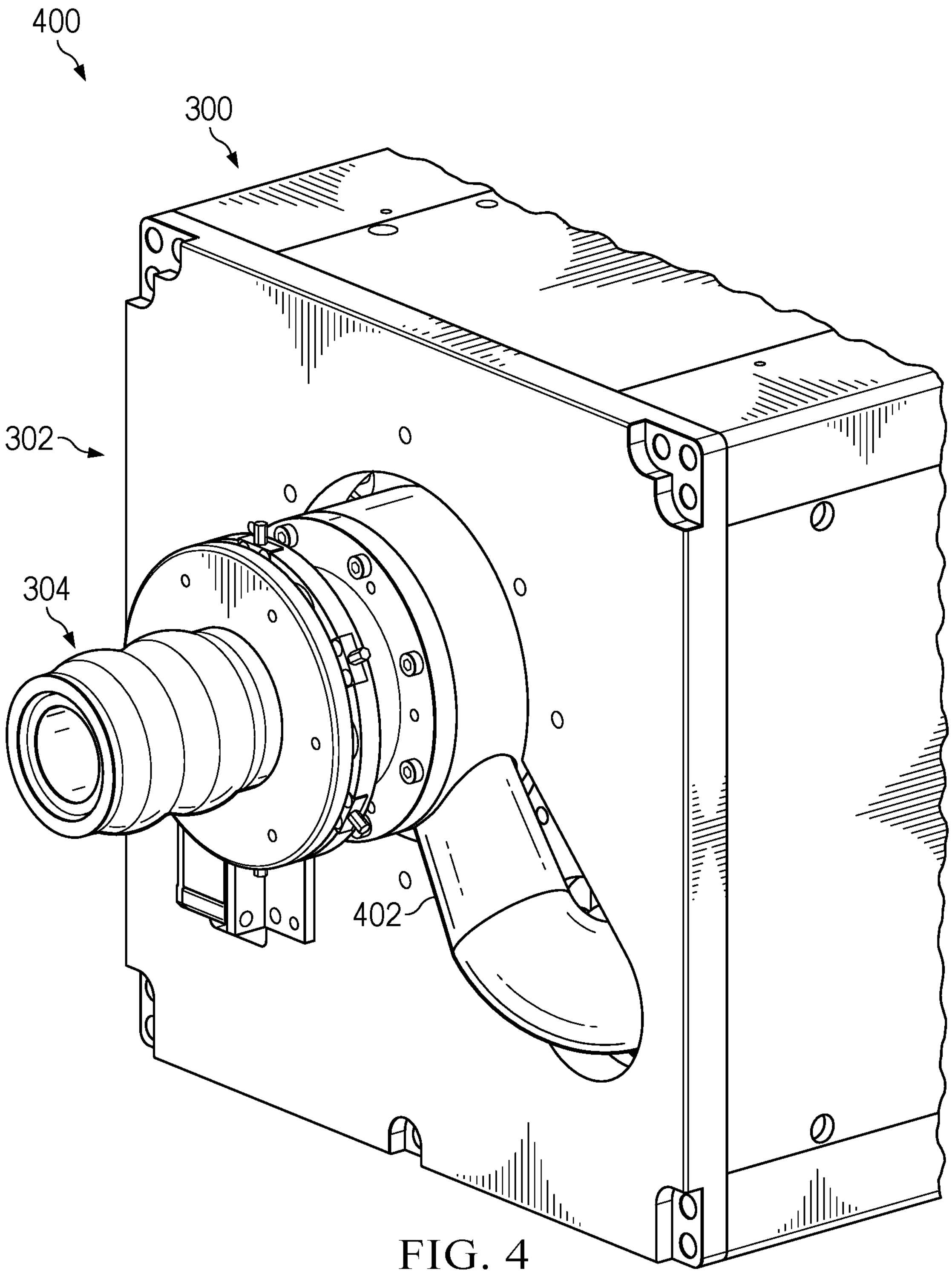
FIG. 4 is an isometric view of an end effector in accordance with an illustrative embodiment.

Turning to FIG. 4, an isometric view of an end effector is depicted in accordance with an illustrative embodiment.

View 400 is a view of end effector 300 of FIG. 3. In view 400, vacuum port 402 is visible. Vacuum port 402 provides vacuum to functional components within end effector 300.

Figure 5:
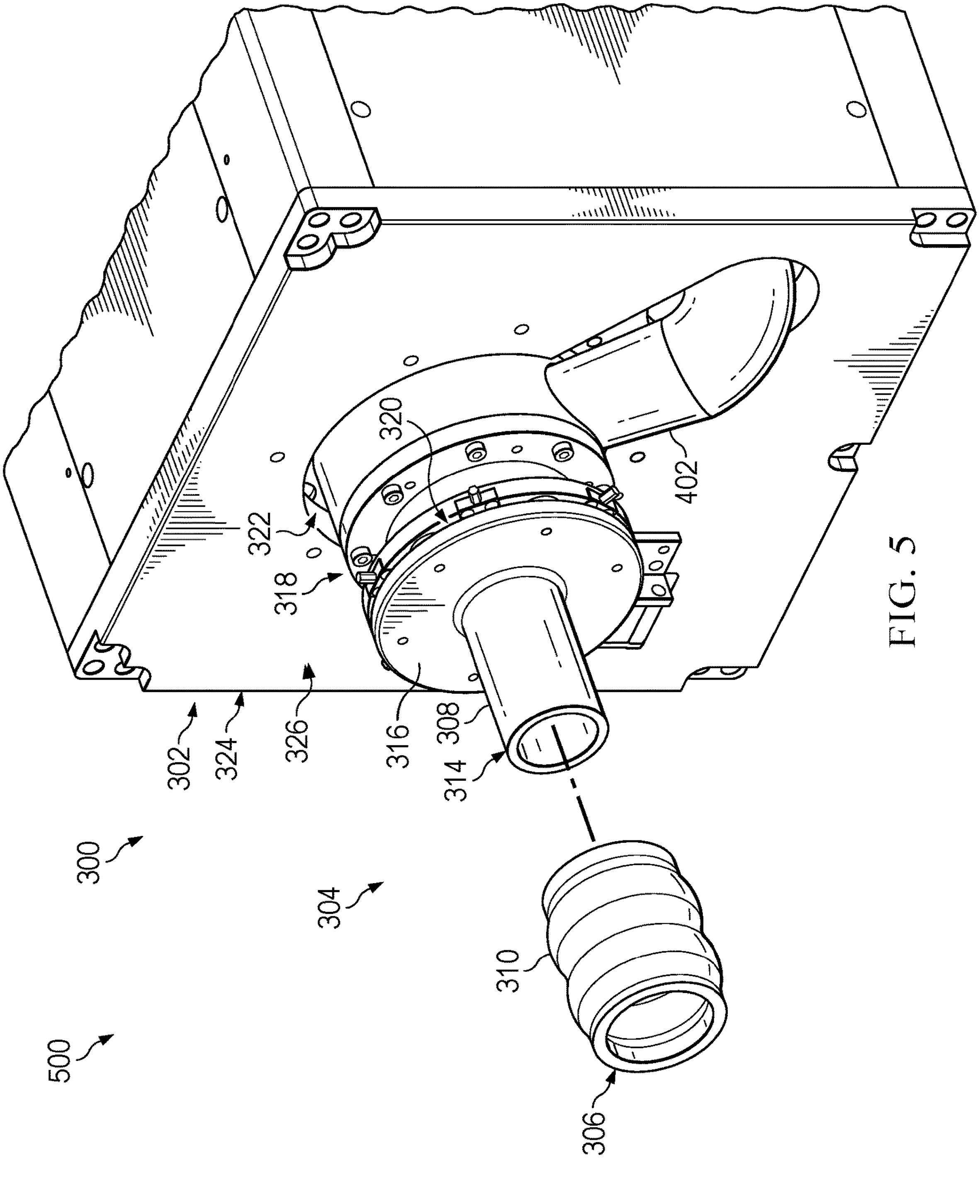
FIG. 5 is an exploded isometric view of portions of an end effector in accordance with an illustrative embodiment.

Turning to FIG. 5, an exploded isometric view of portions of an end effector is depicted in accordance with an illustrative embodiment. View 500 is an exploded view of end effector 300 of FIGS. 3 and 4. Hollow cylinder 314 is visible in view 500.

Figure 6:
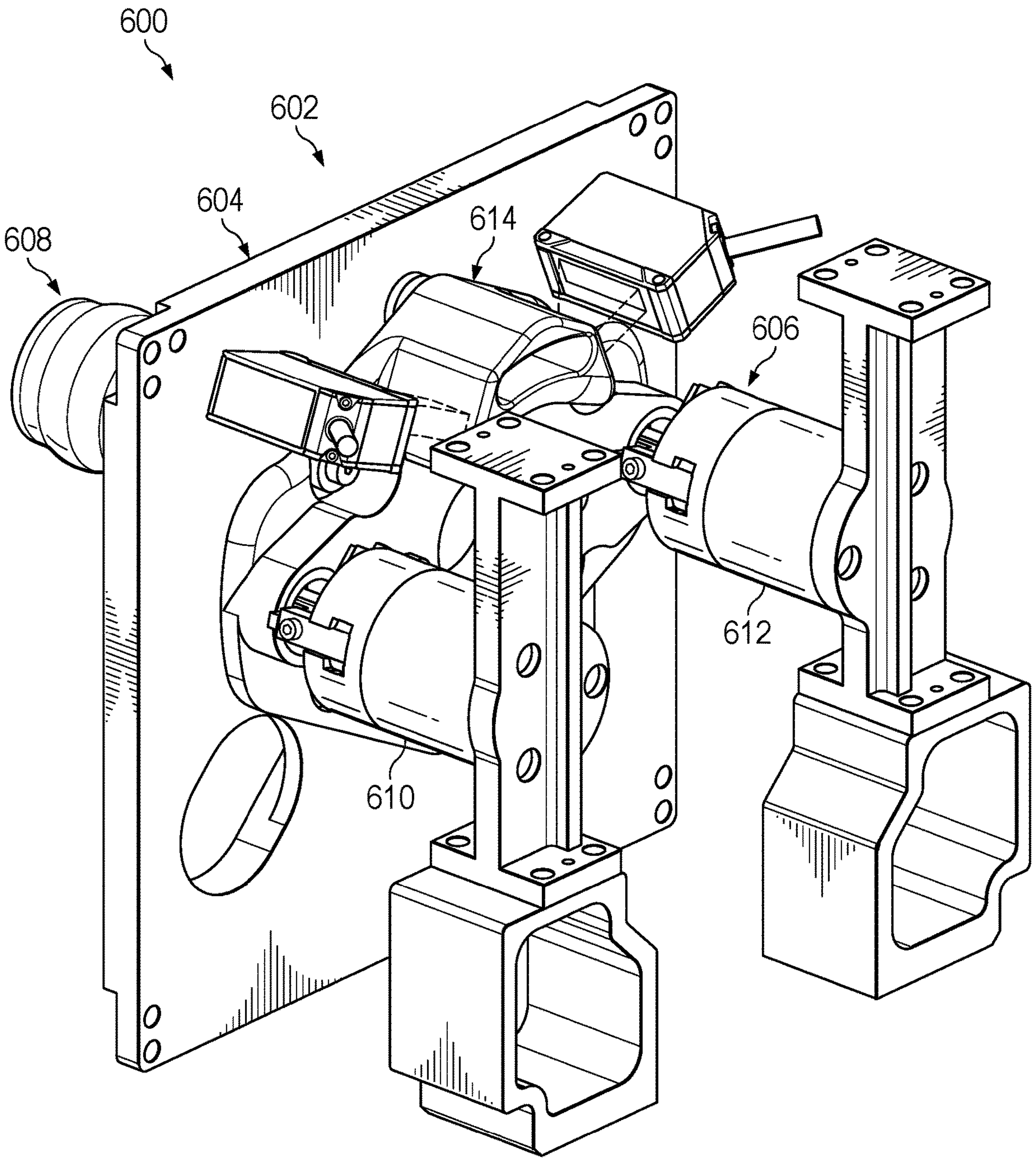
FIG. 6 is an isometric back view of portions of an end effector in accordance with an illustrative embodiment.

Turning to FIG. 6, an isometric back view of portions of an end effector is depicted in accordance with an illustrative embodiment. View 600 is a view of end effector 602 with portions of housing 604 removed for illustrative purposes. End effector 602 is an implementation of end effector 102 of FIG. 1. End effector 602 is a physical implementation of end effector 200 of FIG. 2. In some illustrative examples, end effector 602 is the same as end effector 300 of FIG. 3.

End effector 602 comprises housing 604, actuated mechanical retainer 606, and normalizing nosepiece assembly 608. Actuated mechanical retainer 606 is connected to housing 604 and configured to selectively constrain and release normalizing nosepiece assembly 608 from housing 604. Actuated mechanical retainer 606 comprises gripper 610 and gripper 612. Gripper 610 and gripper 612 can engage or release anti-skid plate 614 of normalizing nosepiece assembly 608. In this illustrative example, gripper 610, gripper 612, and anti-skid plate 614 are contained within housing 604.

Figure 7:
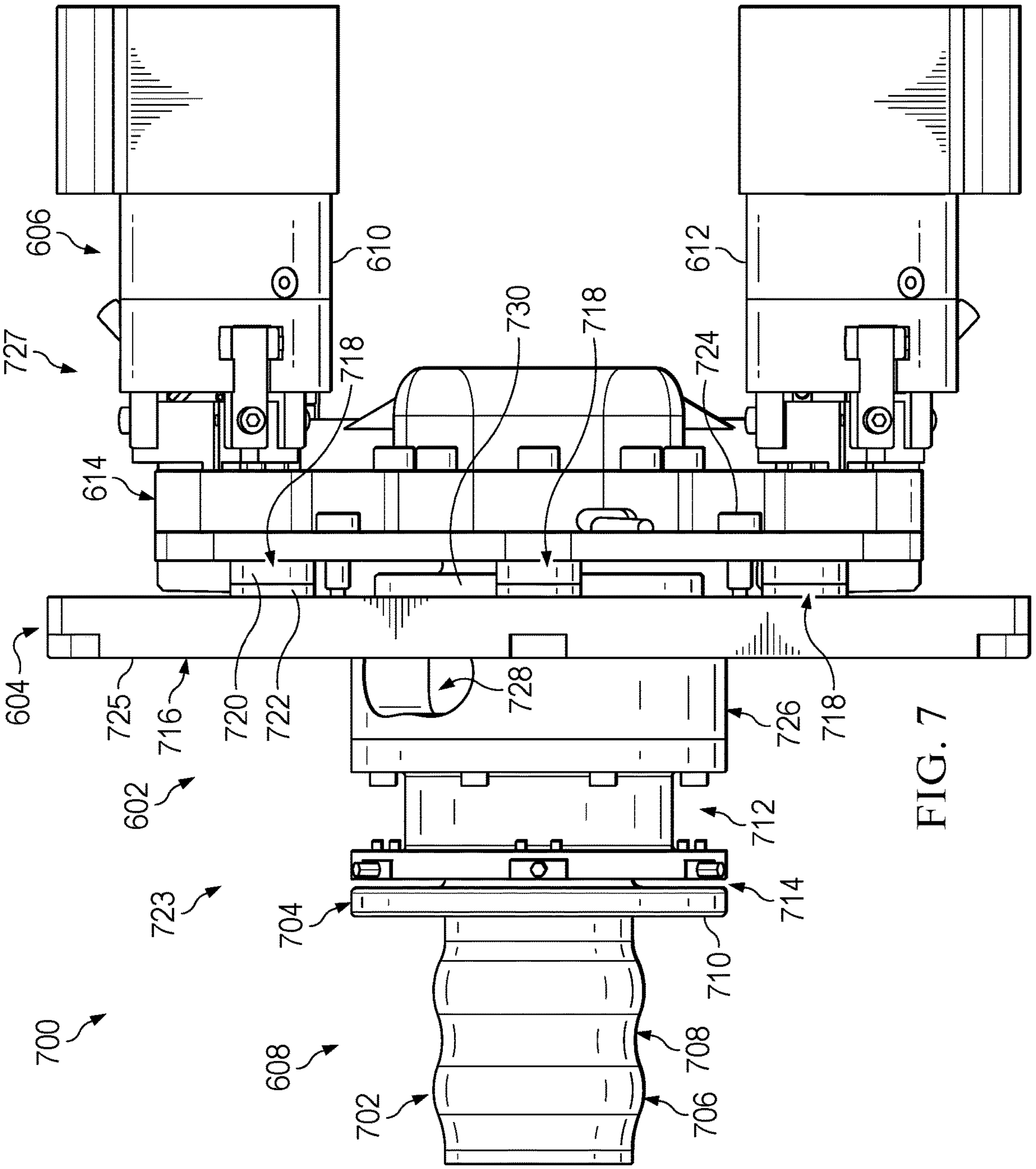
FIG. 7 is a bottom view of portions of an end effector in accordance with an illustrative embodiment.

Turning to FIG. 7, a bottom view of portions of an end effector is depicted in accordance with an illustrative embodiment. View 700 is a bottom view of end effector 602 of FIG. 6.

Normalizing nosepiece assembly 608 is moveable relative to housing 604 when normalizing nosepiece assembly 608 is released by actuated mechanical retainer 606. Normalizing nosepiece assembly 608 has compressible contact structure 702 covering portions of nosepiece bushing 704. Compressible contact structure 702 is configured to contact a surface of a workpiece (not depicted). In this illustrative example, compressible contact structure 702 takes the form of bellows 706 formed of polymeric material 708.

Nosepiece bushing 704 comprises plate 710 separated from bearing housing 712 by air gap 714. Air gap 714 changes when normalizing nosepiece assembly 608 contacts the workpiece.

Bearing housing 712 extends through face 716 of housing 604. Bearing housing 712 is connected to anti-skid plate 614. Magnetic bearing 718 is positioned between anti-skid plate 614 and housing 604. Magnetic bearing 718 is formed by number of magnets 720 connected to anti-skid plate 614 and number of magnets 722 connected to housing 604.

Magnetic bearing 718 comprises sets of opposing magnets that act as a bearing surface to allow anti-skid plate 614 to float relative to housing 604. Fasteners 724 maintain orientation of anti-skid plate 614. Fasteners 724 extend through anti-skid plate 614. In some illustrative examples, fasteners 724 extend through over-sized washers with clearance holes (not depicted).

Normalizing nosepiece assembly 608 extends through housing 604. Nosepiece bushing 704 and bearing housing 712 are on first side 723 of plate 725. Anti-skid plate 614 is positioned on second side 727 of plate 725.

Vacuum chamber 726 is configured to extend through plate 725. Vacuum chamber 726 is configured to connect to bearing housing 712 and to receive a vacuum at port 728. Load cell 730 is configured to connect vacuum chamber 726 to anti-skid plate 614.

Figure 8:
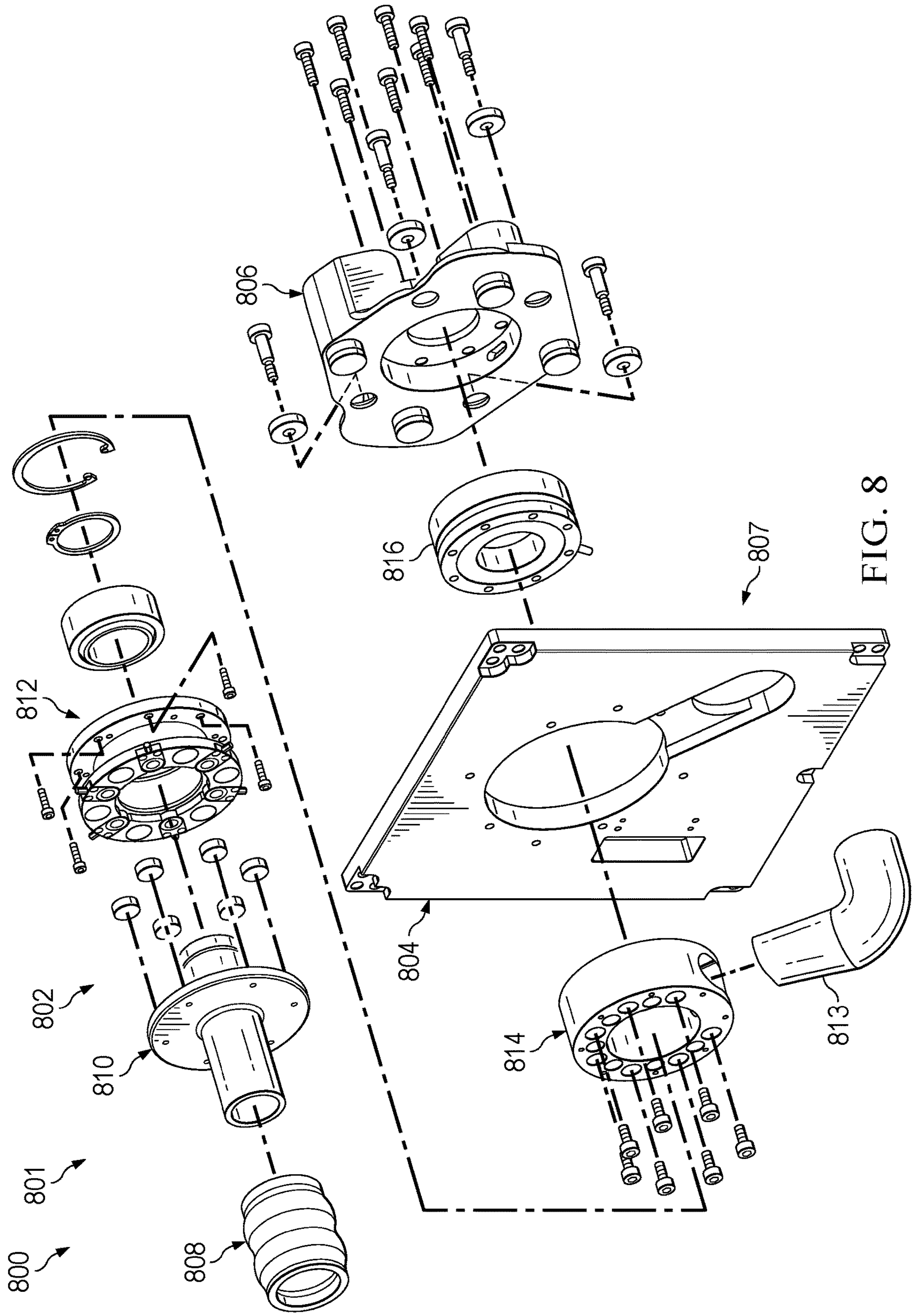
FIG. 8 is an exploded isometric side view of portions of an end effector in accordance with an illustrative embodiment.

Turning to FIG. 8, an exploded isometric side view of portions of an end effector is depicted in accordance with an illustrative embodiment. View 800 depicts a physical implementation of normalizing nosepiece assembly 122 of end effector 102 in FIG. 1. View 800 depicts a physical implementation of normalizing nosepiece assembly 206 of end effector 200 in FIG. 2. In some illustrative examples, normalizing nosepiece assembly 802 is the same as normalizing nosepiece assembly 304 of FIGS. 3-5. In some illustrative examples, normalizing nosepiece assembly 802 is the same as normalizing nosepiece assembly 608 of FIGS. 6-7.

End effector 801 comprises normalizing nosepiece assembly 802. When assembled, components of normalizing nosepiece assembly 802 are positioned on either side of plate 804. Plate 804 is a portion of a housing, such as housing 202 of FIG. 2. Anti-skid plate 806 is on first side 807 of plate 804.

Compressible contact structure 808, nosepiece bushing 810, and bearing housing 812 are on second side 811 of plate 804. Vacuum chamber 814 is configured to extend through plate 804. Vacuum chamber 814 is configured to connect to bearing housing 812 and to receive a vacuum at port 813. Load cell 816 is configured to connect vacuum chamber 814 to anti-skid plate 806.

Figure 9:
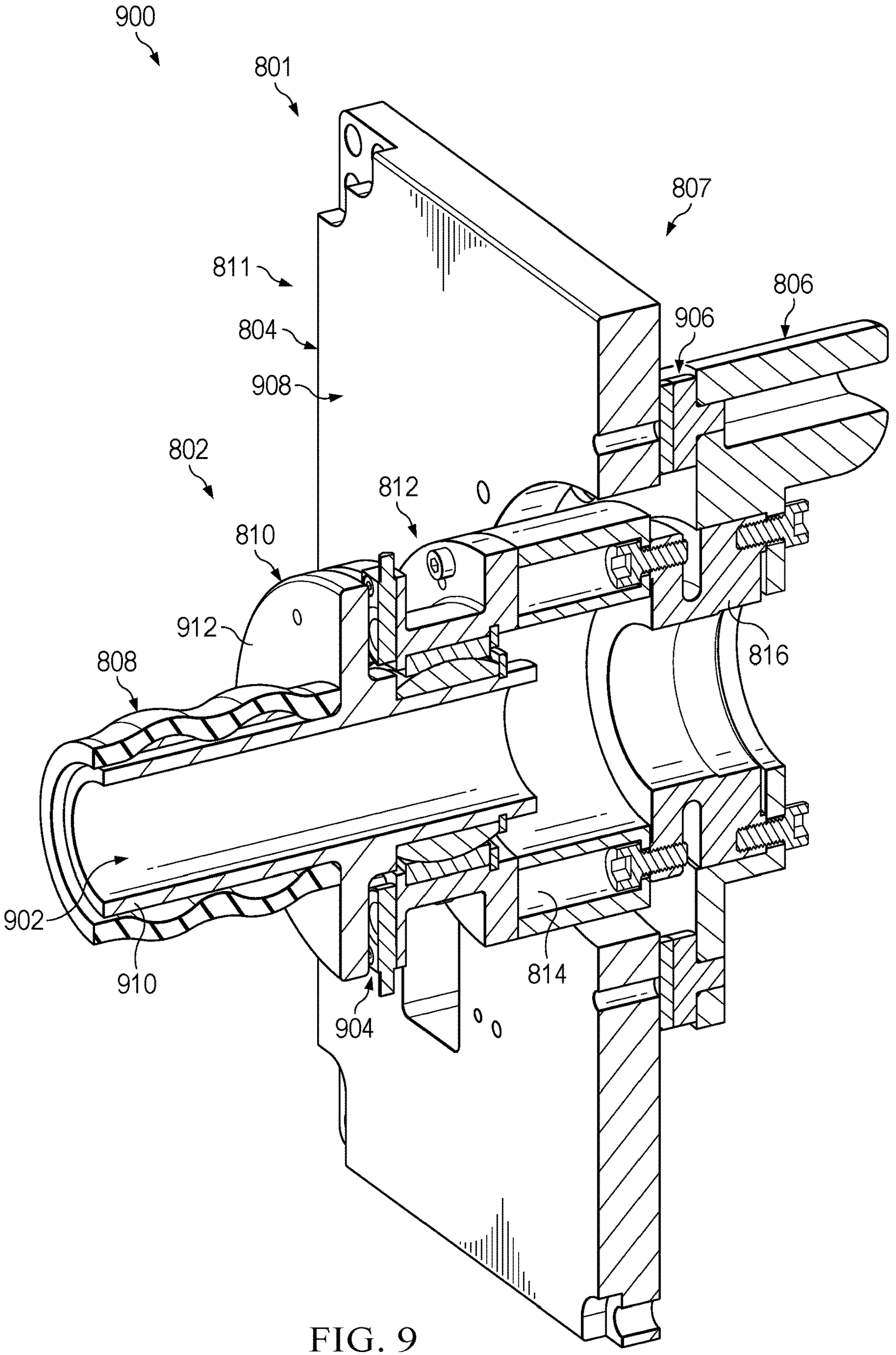
FIG. 9 is a cross-sectional isometric view of portions of an end effector in accordance with an illustrative embodiment.

Turning to FIG. 9, a cross-sectional isometric view of portions of an end effector is depicted in accordance with an illustrative embodiment. View 900 is a cross-sectional view of normalizing nosepiece assembly 802 of FIG. 8.

In view 900, channel 902 extending through nosepiece bushing 810 is visible. During operations of an end effector with normalizing nosepiece assembly 802, a functional tool can extend into channel 902. For example, a drill, a brush, a sensor, a fastener installation tool, or another desirable type of tool can extend through channel 902 to perform an operation on a workpiece.

Air gap 904 between nosepiece bushing 810 and bearing housing 812 is visible in view 900. Air gap 904 can change as nosepiece bushing 810 normalizes relative to a workpiece.

Magnetic bearing 906 is present between plate 804 and anti-skid plate 806. Magnetic bearing 906 aids movement of anti-skid plate 806. Magnetic bearing 906 is formed by magnets of opposite polarity attached to plate 804 and anti-skid plate 806.

Plate 804 forms face 908 of a housing. Normalizing nosepiece assembly 802 performs normalization to a workpiece adjacent face 908 of end effector 801.

Nosepiece bushing 810 comprises hollow cylinder 910 and flange 912. Channel 902 is partially formed by hollow cylinder 910 of nosepiece bushing 810. Flange 912 is a circular flange positioned such that portions of hollow cylinder 910 extend on either side of flange 912.

Figure 10:
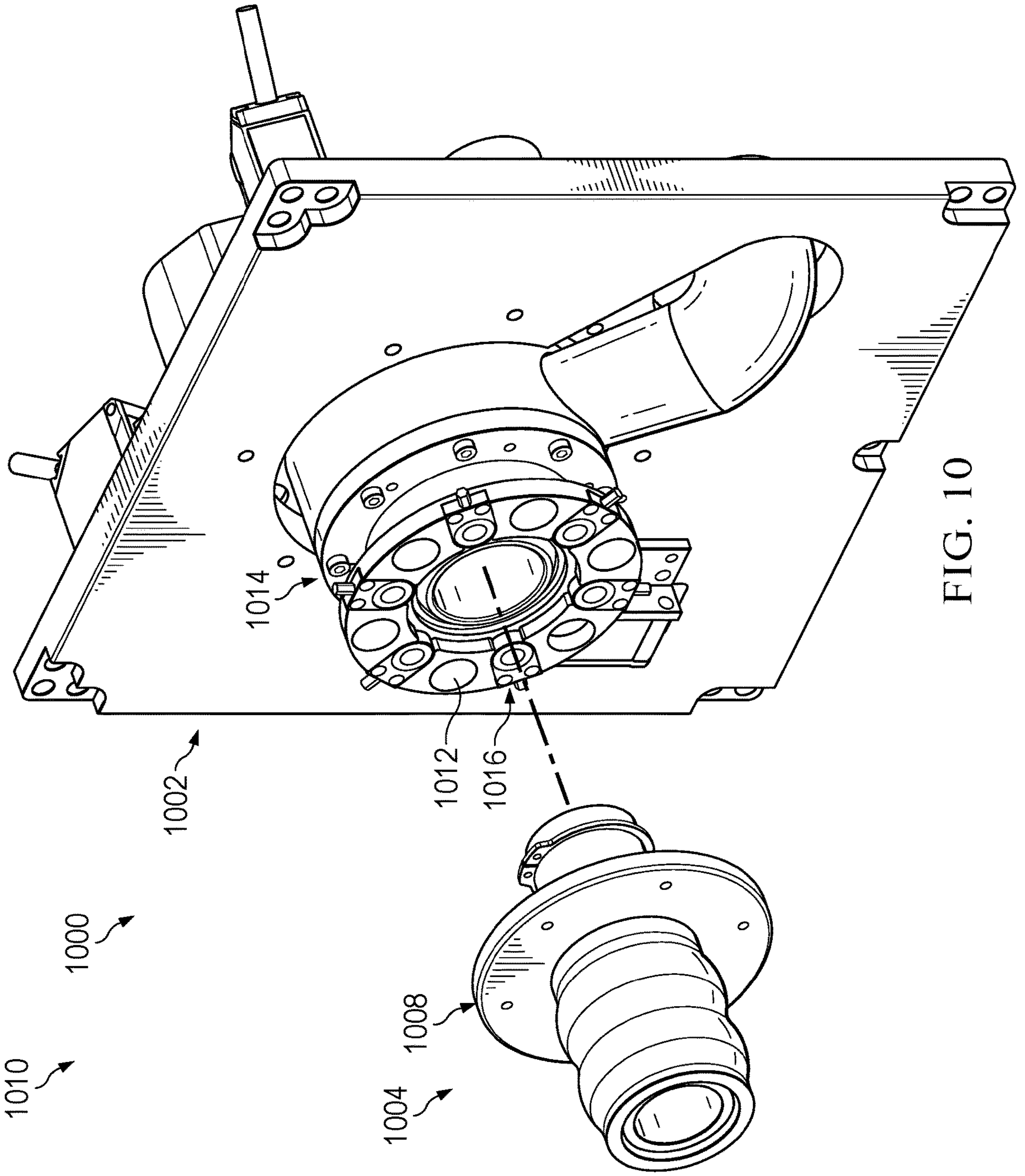
FIG. 10 is a partially exploded isometric view of portions of an end effector in accordance with an illustrative embodiment.

Turning to FIG. 10, a partially exploded isometric view of portions of an end effector is depicted in accordance with an illustrative embodiment. End effector 1000 is a physical implementation of end effector 102 of FIG. 1. End effector 1000 is a physical implementation of end effector 200 of FIG. 2. In some illustrative examples, end effector 1000 is the same as end effector 300 of FIGS. 3-5. In some illustrative examples, end effector 1000 is the same as end effector 602 of FIGS. 6-7. In some illustrative examples, end effector 1000 is the same as end effector 801 of FIGS. 8-9.

End effector 1000 comprises housing 1002 and normalizing nosepiece assembly 1004 moveable relative to housing 1002. Normalizing nosepiece assembly 1004 has nosepiece bushing 1008 configured to contact a workpiece.

Normalizing nosepiece assembly 1004 is exploded in view 1010. In view 1010, nosepiece bushing 1008 has been exploded out from the remainder of normalizing nosepiece assembly 1004. In view 1010, nosepiece bushing 1008 is solid. In view 1010, number of magnets 1012 connected to bearing housing 1014 is visible. Number of magnets 1012 and a number of magnets (not visible) attached to nosepiece bushing 1008 form a magnetic bearing within an air gap between nosepiece bushing 1008 and bearing housing 1014 when normalizing nosepiece assembly 1004 is assembled. Proximity sensors 1016 are also visible in view 1010. Proximity sensors 1016 measure distances within the air gap in normalizing nosepiece assembly 1004 when assembled. Data from proximity sensors 1016 can be used to determine changes in the position of nosepiece bushing 1008 relative to bearing housing 1014.

Although six magnets are depicted in number of magnets 1012, any desirable quantity of magnets can be used. In some illustrative examples, number of magnets 1012 is a single magnet. In some illustrative examples, number of magnets 1012 comprises more than one magnet but fewer than six magnets. In some illustrative examples, number of magnets 1012 comprises more than six magnets.

Although six proximity sensors 1016 are depicted in view 1010, in other illustrative examples, proximity sensors 1016 comprises a different quantity of sensors. In some illustrative examples, proximity sensors 1016 comprises fewer than six sensors. In some illustrative examples, proximity sensors 1016 comprises more than six sensors.

Figure 11:
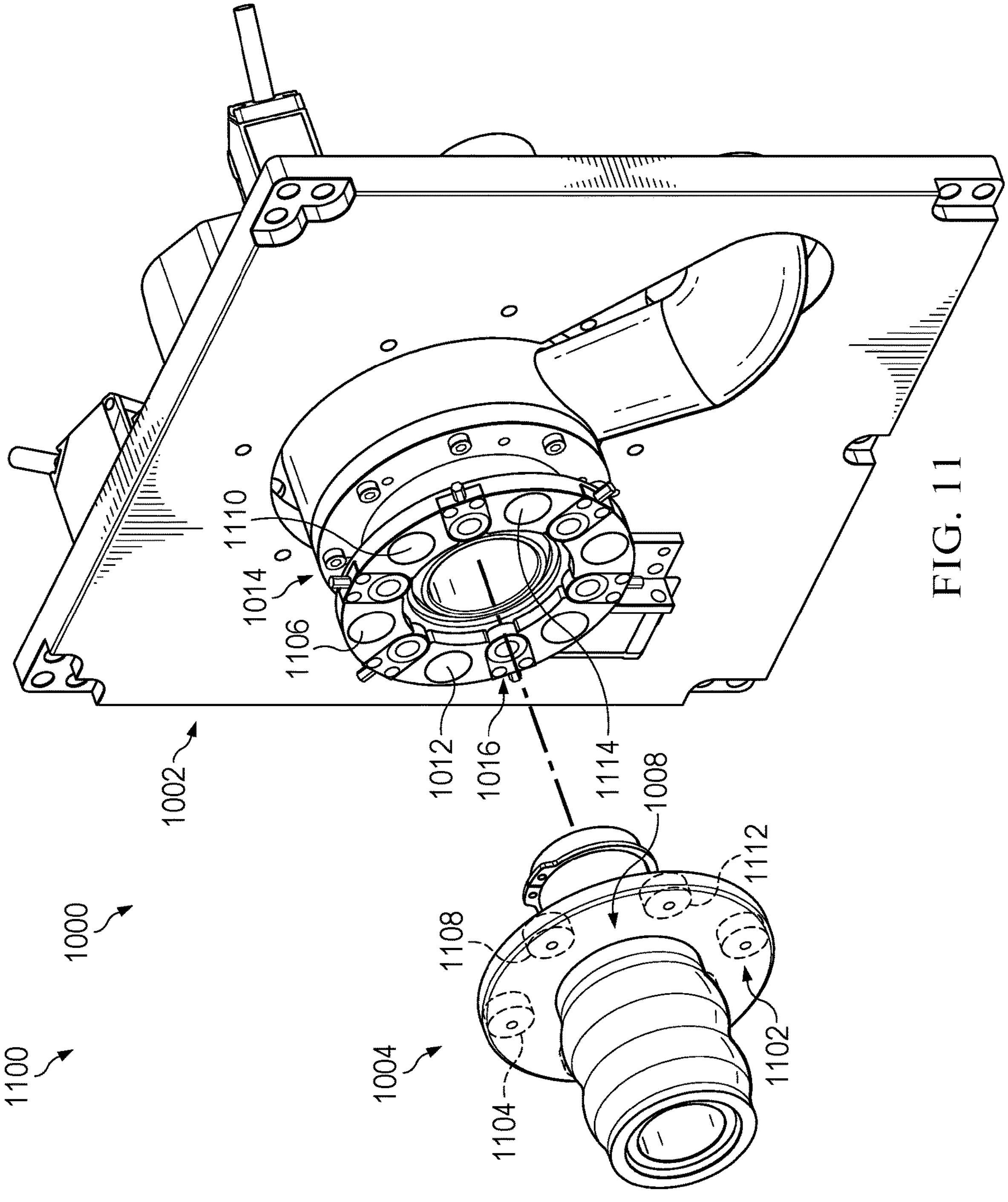
FIG. 11 is a partially exploded isometric view of portions of an end effector in accordance with an illustrative embodiment.

Turning to FIG. 11, a partially exploded isometric view of portions of an end effector is depicted in accordance with an illustrative embodiment. In view 1100, number of magnets 1102 are depicted relative to nosepiece bushing 1008.

Number of magnets 1102 is obscured by portions of nosepiece bushing 1008. In view 1100, number of magnets 1102 connected to nosepiece bushing 1008 are hidden objects and represented in dashed lines. Number of magnets 1012 and a number of magnets 1102 form a magnetic bearing within an air gap between nosepiece bushing 1008 and bearing housing 1014 when normalizing nosepiece assembly 1004 is assembled.

Number of magnets 1012 and number of magnets 1102 form a number of attracting magnet sets and a number of repelling magnet sets. In this illustrative example, the number of attracting magnet sets and number of repelling magnet sets alternate.

For example, in an alternating arrangement, if magnet 1104 and magnet 1106 form a repelling magnet set, magnet 1108 and magnet 1110 form an attracting magnet set. As another example, in an alternating arrangement, if magnet 1108 and magnet 1110 form a repelling magnet set, magnet 1104 and magnet 1106 form an attracting magnet set, and magnet 1112 and magnet 1114 form an attracting magnet set.

Figure 12:
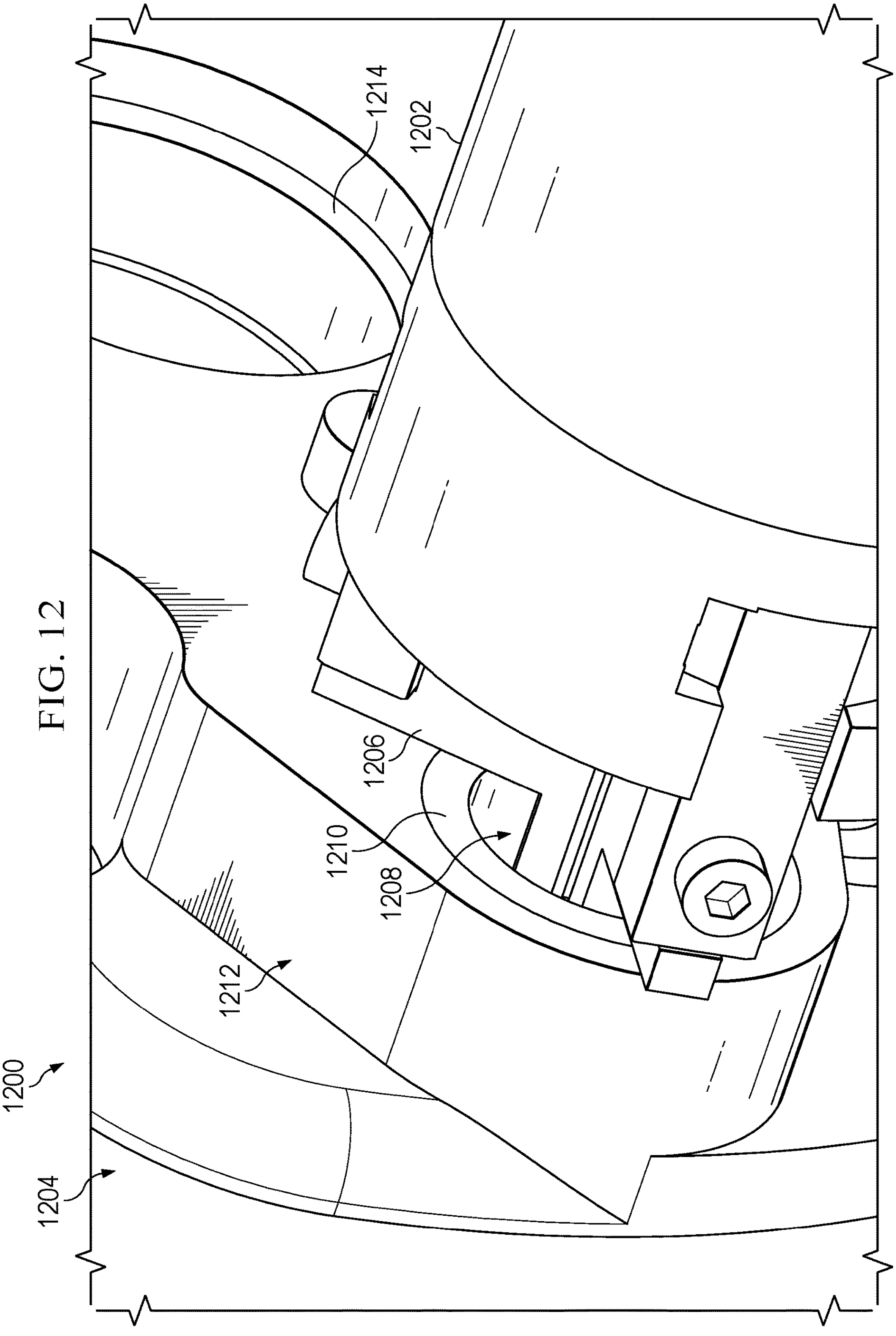
FIG. 12 is an isometric back view of a gripper in an end effector in accordance with an illustrative embodiment.

Turning to FIG. 12, an isometric back view of a gripper in an end effector is depicted in accordance with an illustrative embodiment. End effector 1204 is a physical implementation of end effector 102 of FIG. 1. End effector 1204 is a physical implementation of end effector 200 of FIG. 2. In some illustrative examples, end effector 1204 is the same as end effector 300 of FIGS. 3-5. In some illustrative examples, end effector 1204 is the same as end effector 602 of FIGS. 6-7. In some illustrative examples, end effector 1204 is the same as end effector 801 of FIGS. 8-9. In some illustrative examples, end effector 1204 is the same as end effector 1000 of FIGS. 10-11.

View 1200 is a view of gripper 1202 in end effector 1204. In some illustrative examples, gripper 1202 is a physical implementation of one of grippers 210 in FIG. 2. In some illustrative examples, gripper 1202 is the same as gripper 610 or gripper 612 of FIGS. 6-7. Gripper 1202 can be used in conjunction with components of end effector 801 of FIGS. 8 and 9. Gripper 1202 can be used in conjunction with components of end effector 1000 of FIGS. 10 and 11.

Gripper 1202 comprises fingers 1206. Fingers 1206 are depicted as being in retracted state 1208. In retracted state 1208 fingers 1206 are not in contact with bushing 1210 in anti-skid plate 1212. In retracted state 1208, anti-skid plate 1212, load cell 1214, and other portions of the associated normalizing nosepiece assembly are released and can move relative to end effector 1204.

Figure 13:
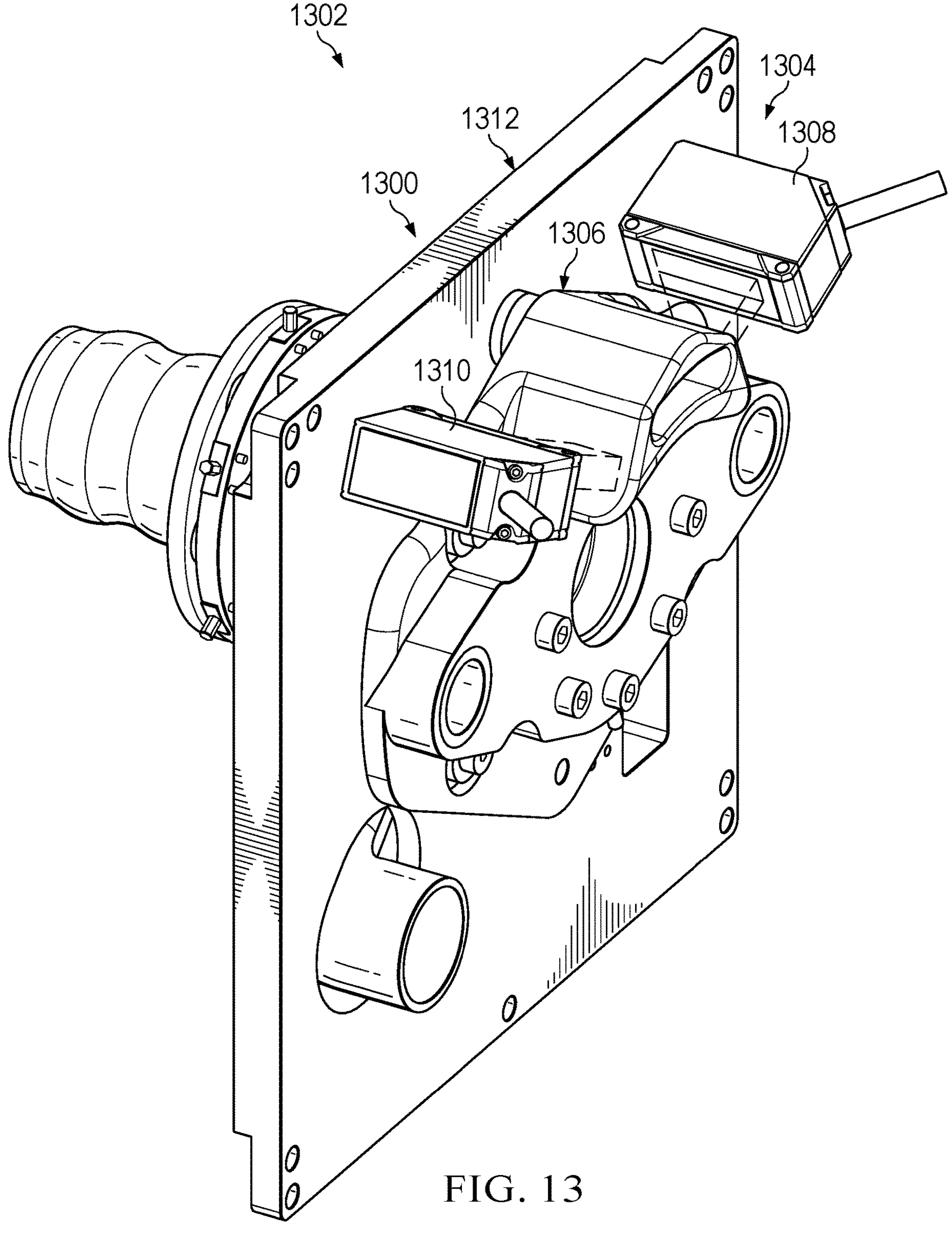
FIG. 13 is an isometric back view of grippers in an end effector in accordance with an illustrative embodiment.

Turning to FIG. 13, an isometric back view of grippers in an end effector is depicted in accordance with an illustrative embodiment. End effector 1300 is a physical implementation of end effector 102 of FIG. 1. End effector 1300 is a physical implementation of end effector 200 of FIG. 2. In some illustrative examples, end effector 1300 is the same as end effector 300 of FIGS. 3-5. In some illustrative examples, end effector 1300 is the same as end effector 602 of FIGS. 6-7. In some illustrative examples, end effector 1300 is the same as end effector 801 of FIGS. 8-9. In some illustrative examples, end effector 1300 is the same as end effector 1000 of FIGS. 10-11. In some illustrative examples, end effector 1300 is the same as end effector 1204 of FIG. 12.

End effector 1300 has portions removed for ease of illustration. In view 1302, portions of the housing and actuated mechanical retainer are not present for ease of discussion. In view 1302, distance sensors 1304 are positioned to determine changes in position of anti-skid plate 1306. Distance sensors 1304 are mounted to the housing. Distance sensor 1308 and distance sensor 1310 are connected to plate 1312 of the housing of end effector 1300. As anti-skid plate 1306 moves relative to plate 1312, data from distance sensors 1304 can be used to determine changes in the location of anti-skid plate 1306 relative to plate 1312.

Figure 14:
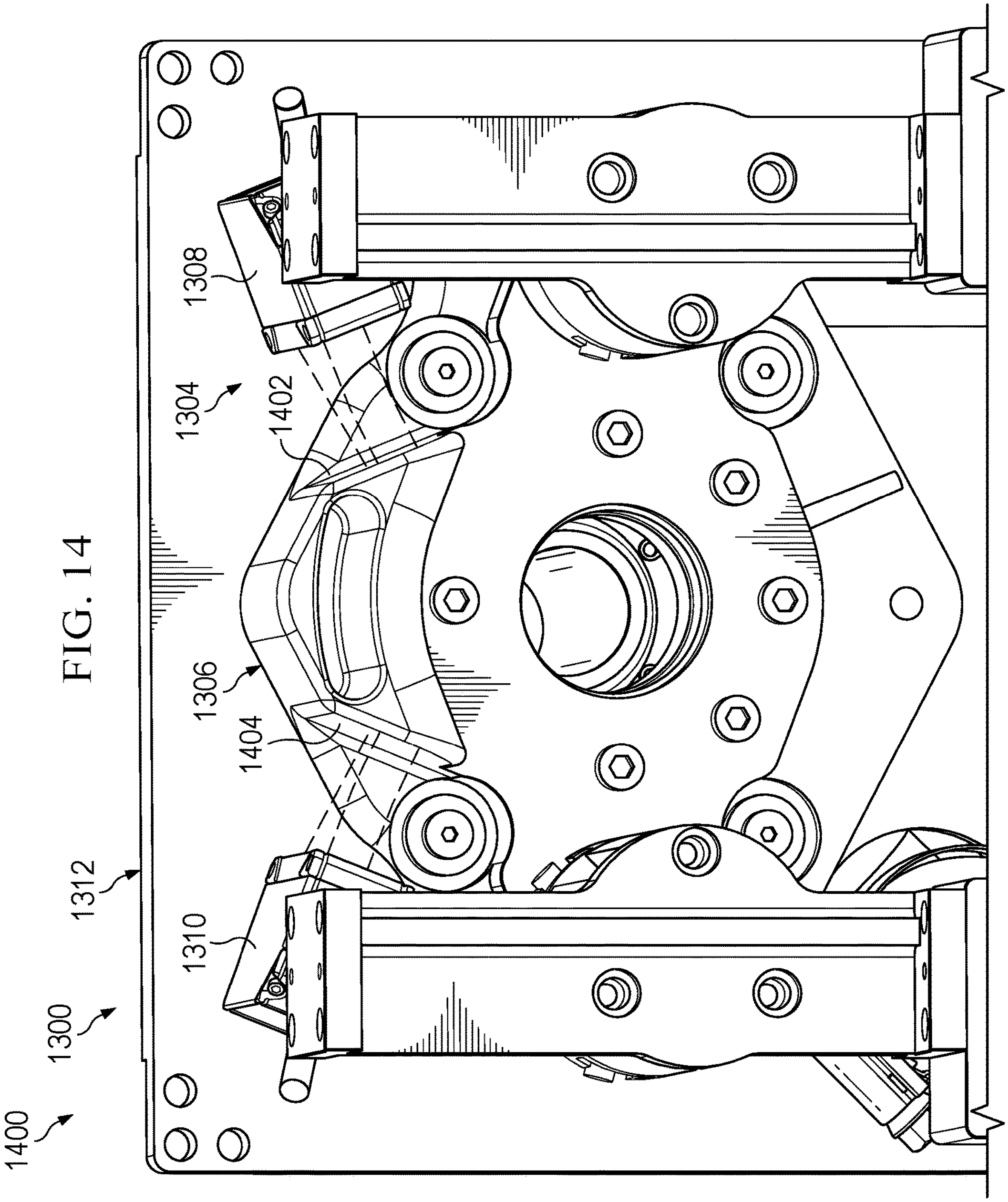
FIG. 14 is a back view of portions of an end effector in accordance with an illustrative embodiment.

Turning to FIG. 14, a back view of portions of an end effector is depicted in accordance with an illustrative embodiment. View 1400 is a back view of end effector 1300.

Once the normalizing nosepiece assembly is normalized to the workpiece, the normalizing nosepiece assembly remains in that vector normal to the contour. Afterwards, the robot and the end effector are reconnected to the normalizing nosepiece assembly. At this point the robot and the end effector are still in their original orientation. Distance sensors 1304 measure the change, how far the normalizing nosepiece assembly moved to normalize, and then relay that information back to a controller (not depicted) for the robot (not depicted). The controller directs the robot to align with the normal of the normalizing nosepiece assembly. Once the robot is in alignment, the grippers (not depicted) will lock back in position.

Distance sensors 1304 provide two laser distance measurements of known surfaces on anti-skid plate 1306. Known surfaces include surface 1402 and surface 1404 of anti-skid plate 1306. The laser of each of distance sensor 1308 and distance sensor 1310 is at an angle to determine how far the robot attached to end effector 1300 should move to get the vector normal of the normalizing nosepiece assembly to a centerline of end effector 1300.

Figure 15:
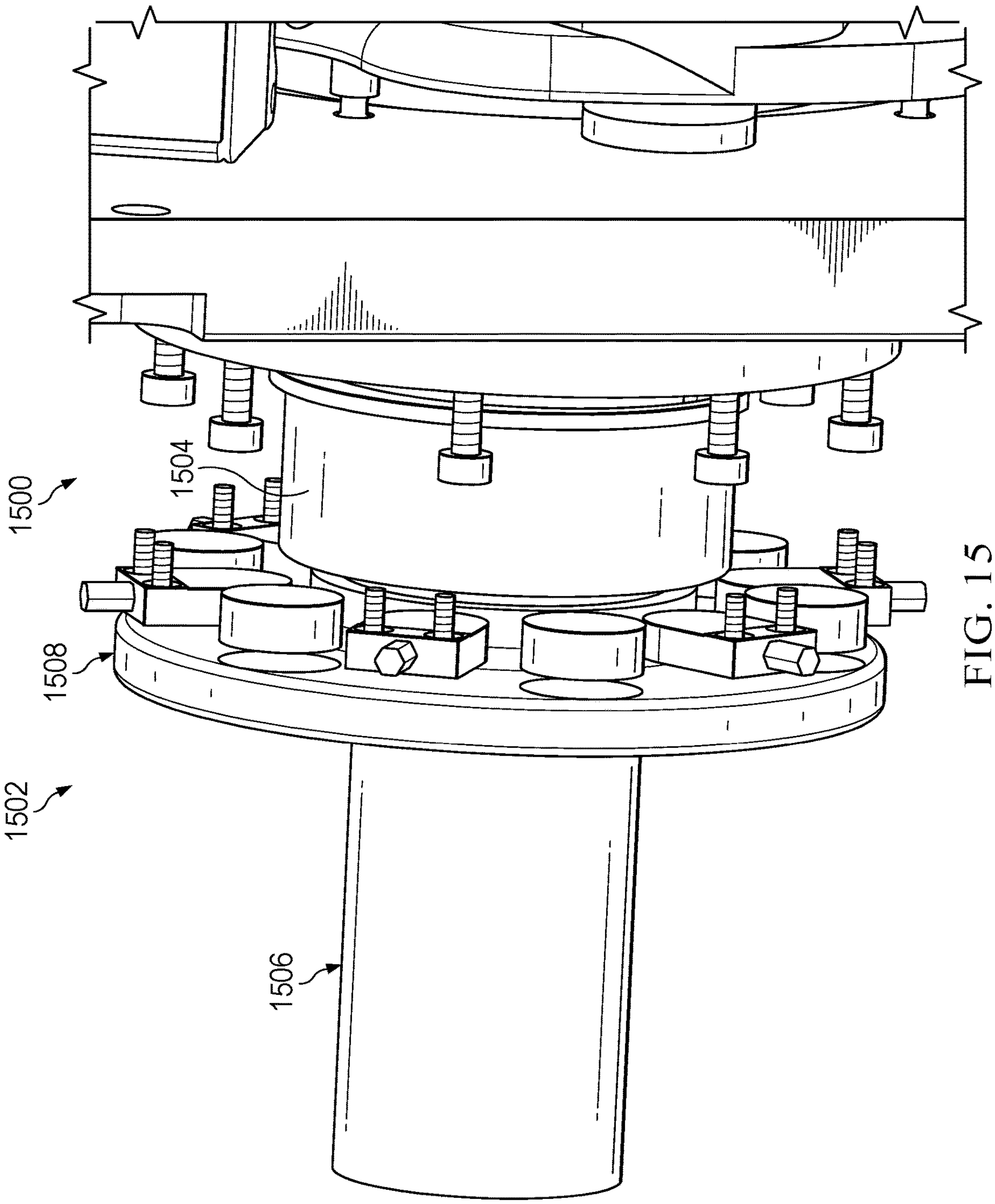
FIG. 15 is an isometric view of portions of a normalizing nosepiece assembly of an end effector in accordance with an illustrative embodiment.

Turning to FIG. 15, an isometric view of portions of a normalizing nosepiece assembly of an end effector is depicted in accordance with an illustrative embodiment. End effector 1500 is a physical implementation of end effector 102 of FIG. 1. End effector 1500 is a physical implementation of end effector 200 of FIG. 2. In some illustrative examples, end effector 1500 is the same as end effector 300 of FIGS. 3-5. In some illustrative examples, end effector 1500 is the same as end effector 602 of FIGS. 6-7. In some illustrative examples, end effector 1500 is the same as end effector 801 of FIGS. 8-9. In some illustrative examples, end effector 1500 is the same as end effector 1000 of FIGS. 10-11. In some illustrative examples, end effector 1500 is the same as end effector 1204 of FIG. 12. In some illustrative examples, end effector 1500 is the same as end effector 1300 of FIGS. 13-14.

In view 1502 of end effector 1500, a bearing housing has been removed for ease of illustration. In view 1502, spherical bearing 1504 is positioned over a portion of hollow cylinder 1506 of nosepiece bushing 1508.

Figure 16:
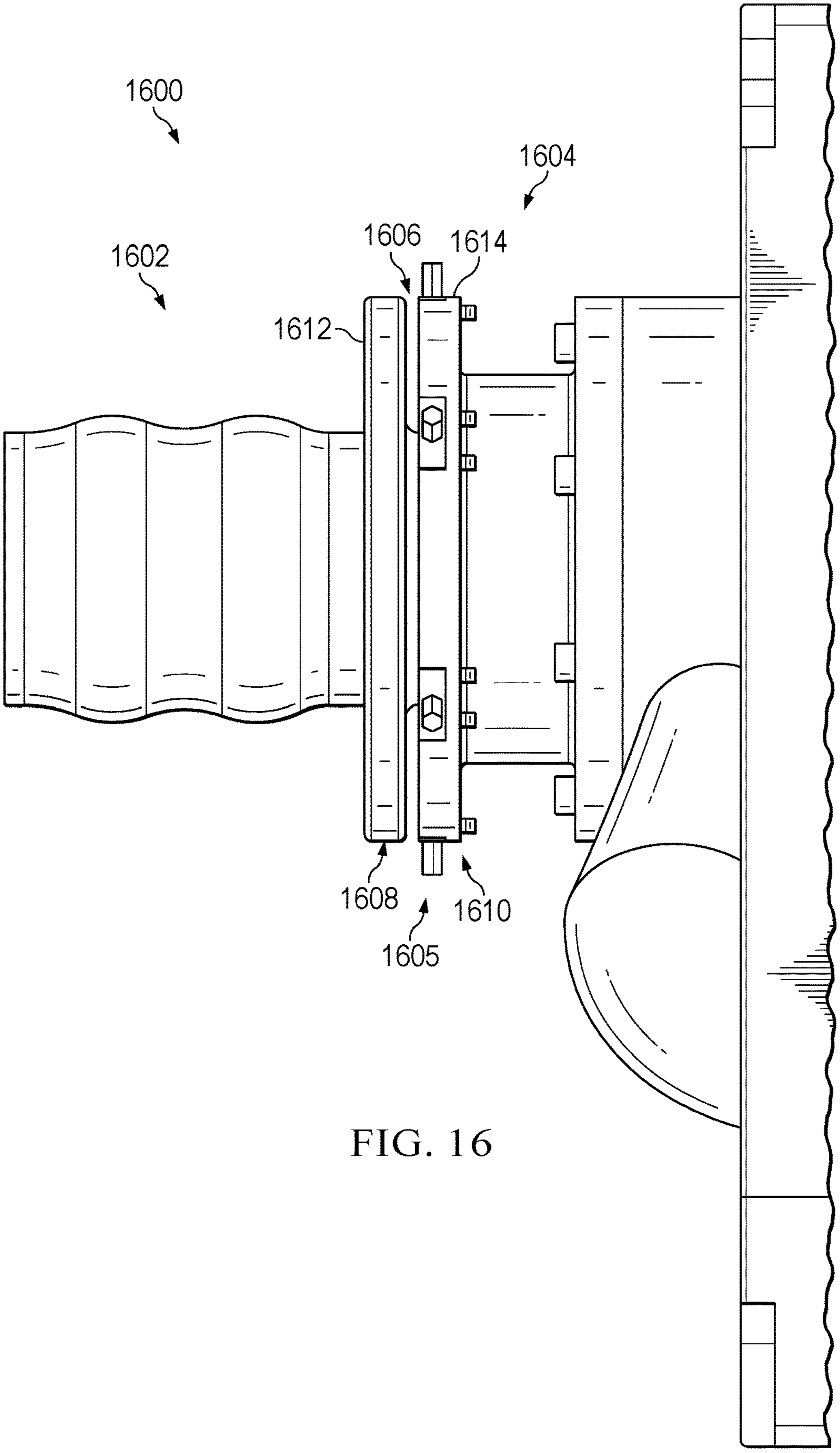
FIG. 16 is a side view of portions of an end effector in accordance with an illustrative embodiment.

Turning to FIG. 16, a side view of portions of an end effector is depicted in accordance with an illustrative embodiment. End effector 1604 is a physical implementation of end effector 102 of FIG. 1. End effector 1604 is a physical implementation of end effector 200 of FIG. 2. In some illustrative examples, end effector 1604 is the same as end effector 300 of FIGS. 3-5. In some illustrative examples, end effector 1604 is the same as end effector 602 of FIGS. 6-7. In some illustrative examples, end effector 1604 is the same as end effector 801 of FIGS. 8-9. In some illustrative examples, end effector 1604 is the same as end effector 1000 of FIGS. 10-11. In some illustrative examples, end effector 1604 is the same as end effector 1204 of FIG. 12. In some illustrative examples, end effector 1604 is the same as end effector 1300 of FIGS. 13-14. In some illustrative examples, end effector 1604 is the same as end effector 1500 of FIG. 15. In view 1600, normalizing nosepiece assembly 1602 of end effector 1604 is in neutral position 1605. In view 1600, air gap 1606 between nosepiece bushing 1608 and bearing housing 1610 is substantially the same throughout. In view 1600, flange 1612 of nosepiece bushing 1608 is substantially parallel to flange 1614 of bearing housing 1610.

Figure 17:
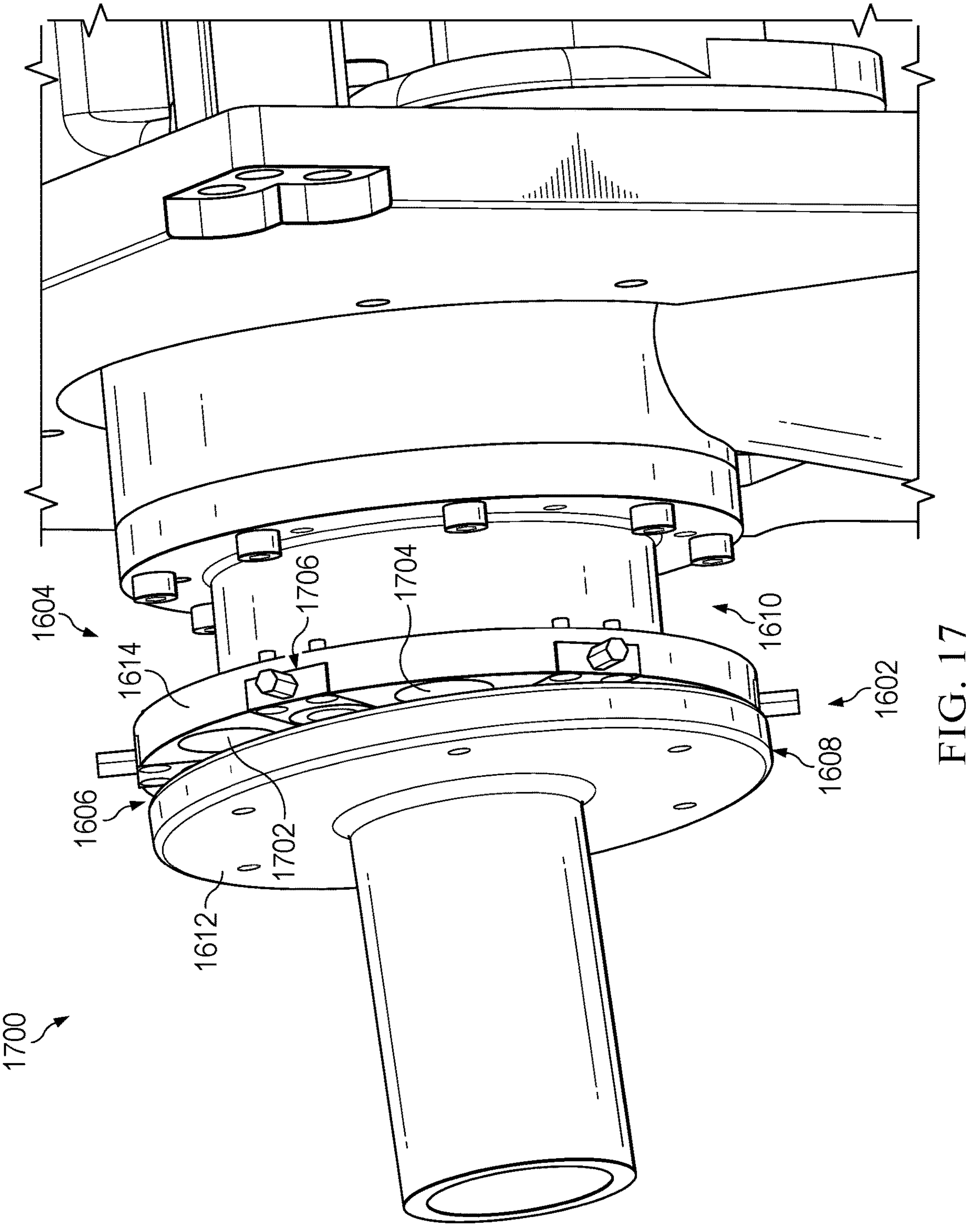
FIG. 17 is an isometric view of a normalizing nosepiece assembly moving in an end effector in accordance with an illustrative embodiment.

Turning to FIG. 17, an isometric view of a normalizing nosepiece assembly moving in an end effector is depicted in accordance with an illustrative embodiment. View 1700 is a view of end effector 1604 of FIG. 16. In view 1700, flange 1612 of nosepiece bushing 1608 has moved relative to flange 1614 of bearing housing 1610. Air gap 1606 changes shape as normalizing nosepiece assembly 1602 moves relative to the housing. In view 1700, air gap 1606 is not consistent throughout. In view 1700, some locations of air gap 1606 are larger than other locations.

In view 1700 number of magnets 1702 attached to flange 1614 of bearing housing 1610 is visible. Number of magnets 1702 and a number of magnets (not visible) attached to nosepiece bushing 1608 form magnetic bearing 1704 within air gap 1606. Proximity sensors 1706 are also visible within air gap 1606. Proximity sensors 1706 measure distances within air gap 1606 at multiple locations. Data from proximity sensors 1706 can be used to determine changes in the position of nosepiece bushing 1608 relative to bearing housing 1610.

Figure 18:
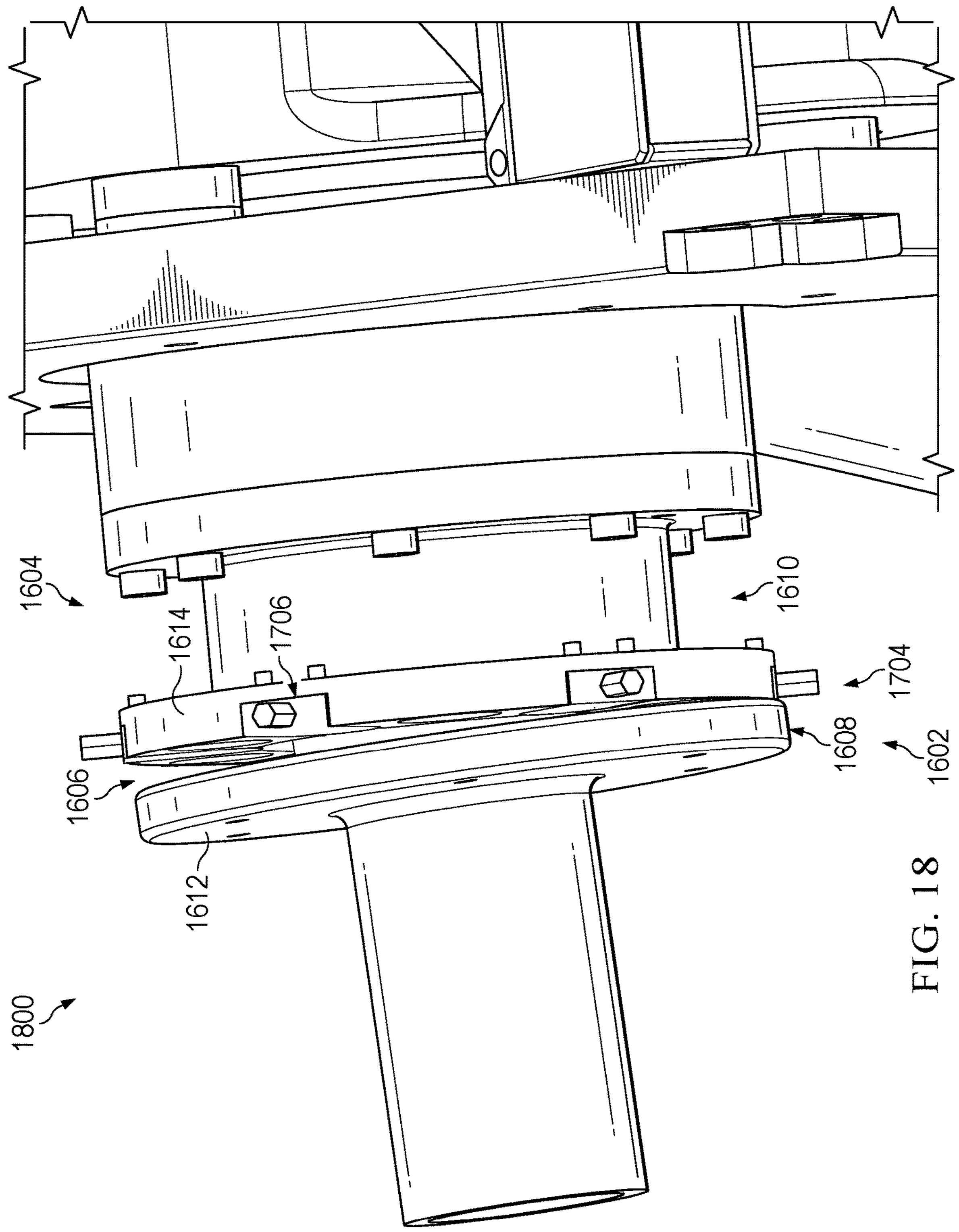
FIG. 18 is an isometric view of a normalizing nosepiece assembly moving in an end effector in accordance with an illustrative embodiment.

Turning to FIG. 18, an isometric view of a normalizing nosepiece assembly moving in an end effector is depicted in accordance with an illustrative embodiment. View 1800 is a view of end effector 1604 of FIG. 16. In view 1800, flange 1612 of nosepiece bushing 1608 has moved relative to flange 1614 of bearing housing 1610. In view 1800, air gap 1606 is not consistent throughout. In view 1800, some locations of air gap 1606 are larger than other locations.

Figure 19:
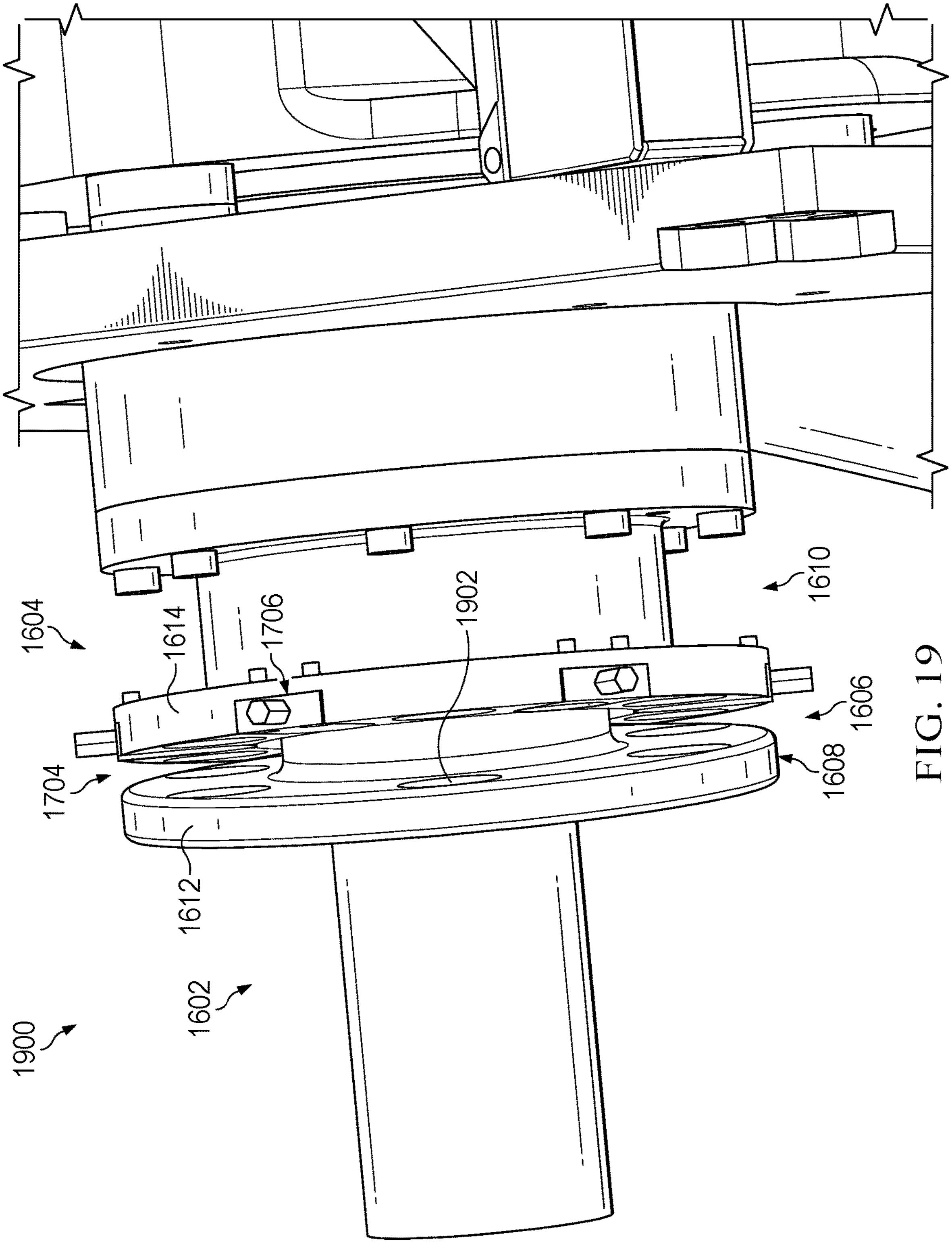
FIG. 19 is an isometric view of a normalizing nosepiece assembly moving in an end effector in accordance with an illustrative embodiment.

Turning to FIG. 19, an isometric view of a normalizing nosepiece assembly moving in an end effector is depicted in accordance with an illustrative embodiment. View 1900 is a view of end effector 1604 of FIG. 16. In view 1900, flange 1612 of nosepiece bushing 1608 has moved relative to flange 1614 of bearing housing 1610. In view 1900, air gap 1606 is not consistent throughout. In view 1900, some locations of air gap 1606 are larger than other locations.

In view 1900 number of magnets 1902 attached to flange 1612 of nosepiece bushing 1608 is visible. Number of magnets 1902 and number of magnets 1702 of FIG. 17 form magnetic bearing 1704 within air gap 1606. Although proximity sensors 1706 are attached to bearing housing 1610 in view 1900, in some illustrative examples, proximity sensors 1706 could be attached to nosepiece bushing 1608. In some illustrative examples, a number of proximity sensors 1706 can be attached to nosepiece bushing 1608 and a number of proximity sensors 1706 can be attached to bearing housing 1610.

Figure 20:
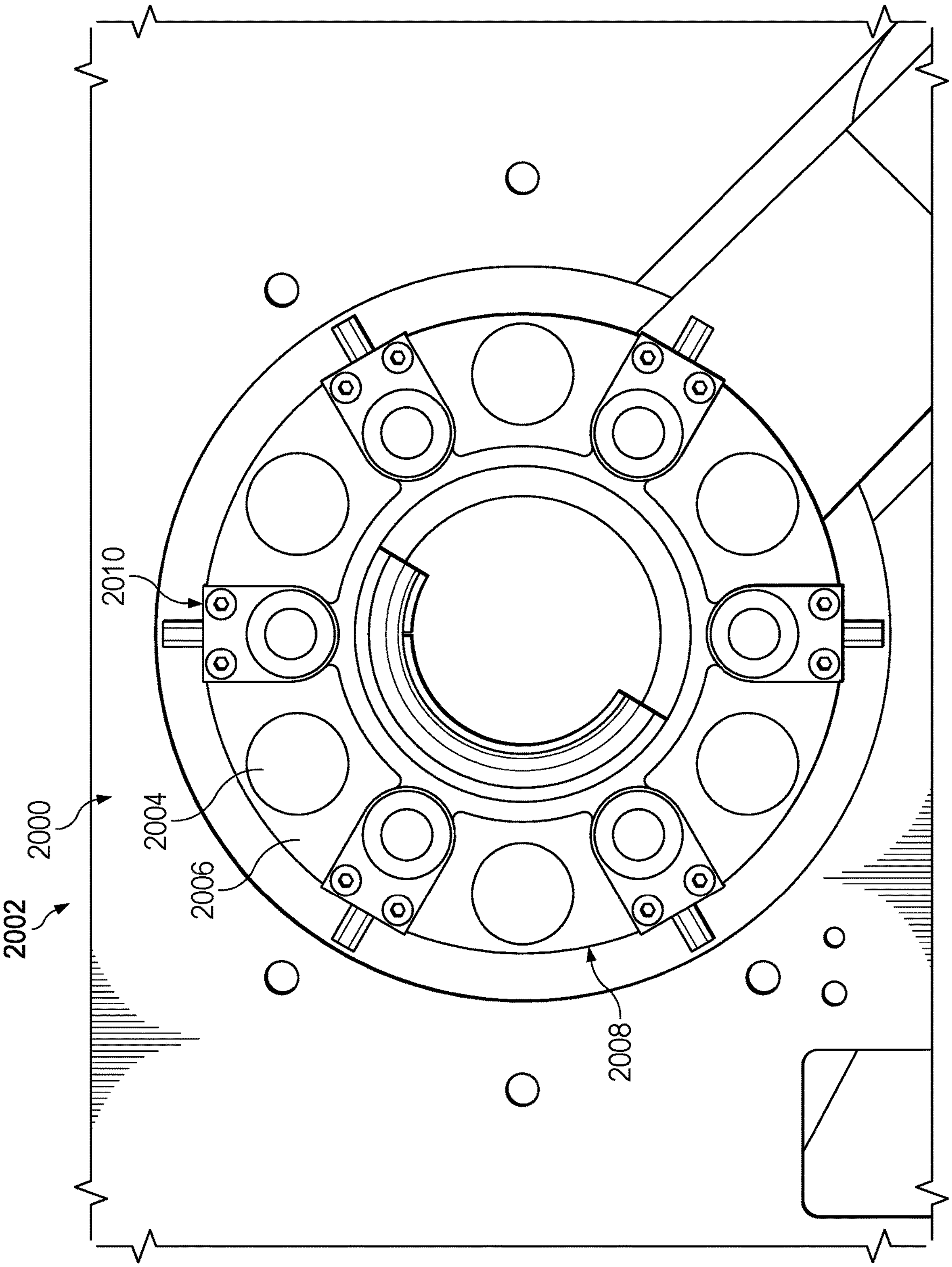
FIG. 20 is a front view of a magnetic bearing of a normalizing nosepiece assembly in accordance with an illustrative embodiment.

Turning to FIG. 20, a front view of a magnetic bearing of a normalizing nosepiece assembly is depicted in accordance with an illustrative embodiment. End effector 2000 is a physical implementation of end effector 102 of FIG. 1. End effector 2000 is a physical implementation of end effector 200 of FIG. 2. In some illustrative examples, end effector 2000 is the same as end effector 300 of FIGS. 3-5. In some illustrative examples, end effector 2000 is the same as end effector 602 of FIGS. 6-7. In some illustrative examples, end effector 2000 includes normalizing nosepiece assembly 802 of FIGS. 8 and 9. In some illustrative examples, end effector 2000 is the same as end effector 1000 of FIGS. 10-11. In some illustrative examples, end effector 2000 is the same as end effector 1204 of FIG. 12. In some illustrative examples, end effector 2000 is the same as end effector 1300 of FIGS. 13-14. In some illustrative examples, end effector 2000 is the same as end effector 1500 of FIG. 15. In some illustrative examples, end effector 2000 is the same as end effector 1604 of FIGS. 16-19.

View 2002 is a view of end effector 2000 with a nosepiece bushing (not depicted) removed for ease of discussion. Number of magnets 2004 are attached to flange 2006 of bearing housing 2008. Proximity sensors 2010 are attached to bearing housing 2008 and disposed between number of magnets 2004.

Figure 21A:
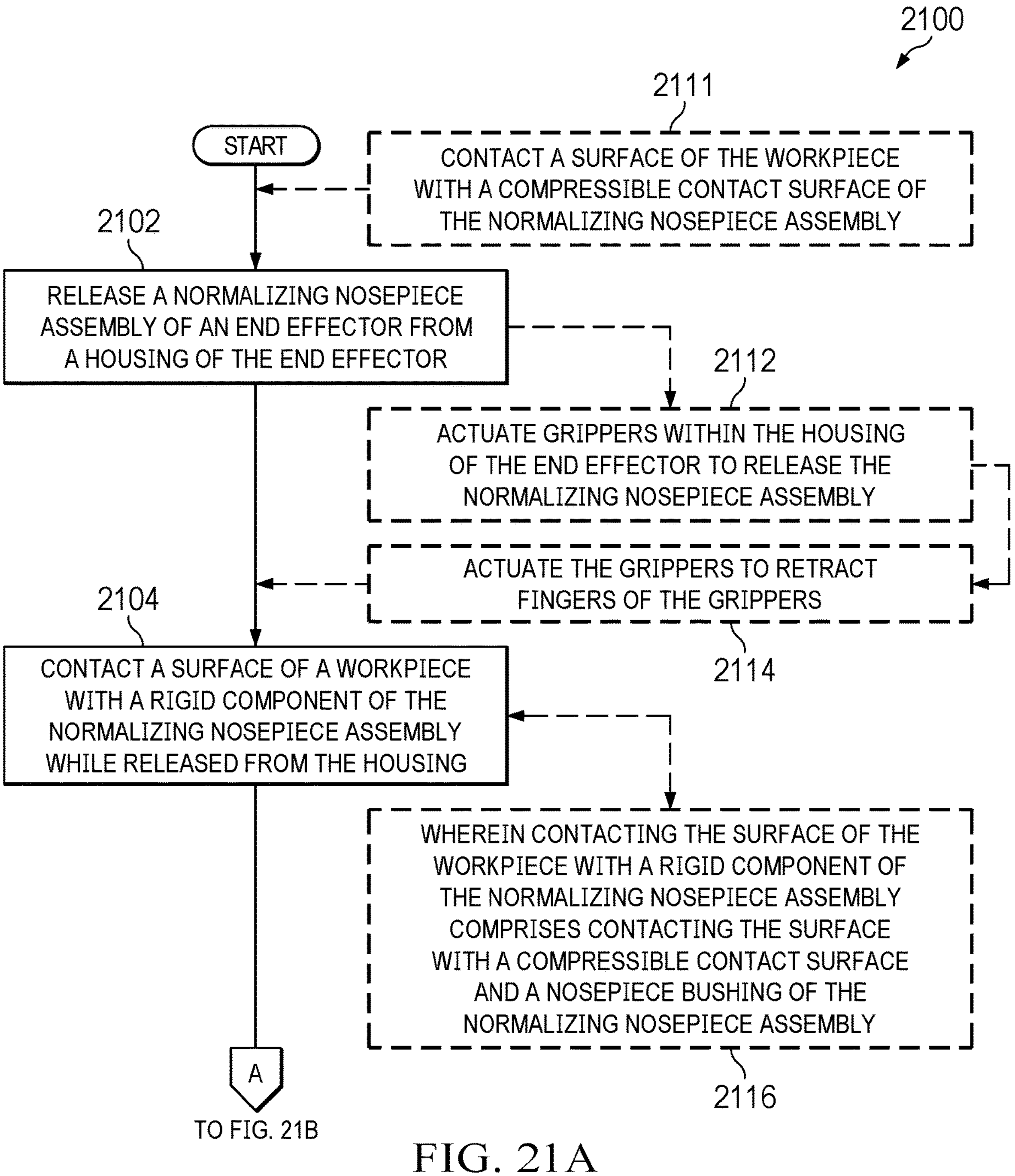
FIGS. 21A and 21B are a flowchart of a method of normalizing an end effector relative to a workpiece in accordance with an illustrative embodiment.
Figure 21B:
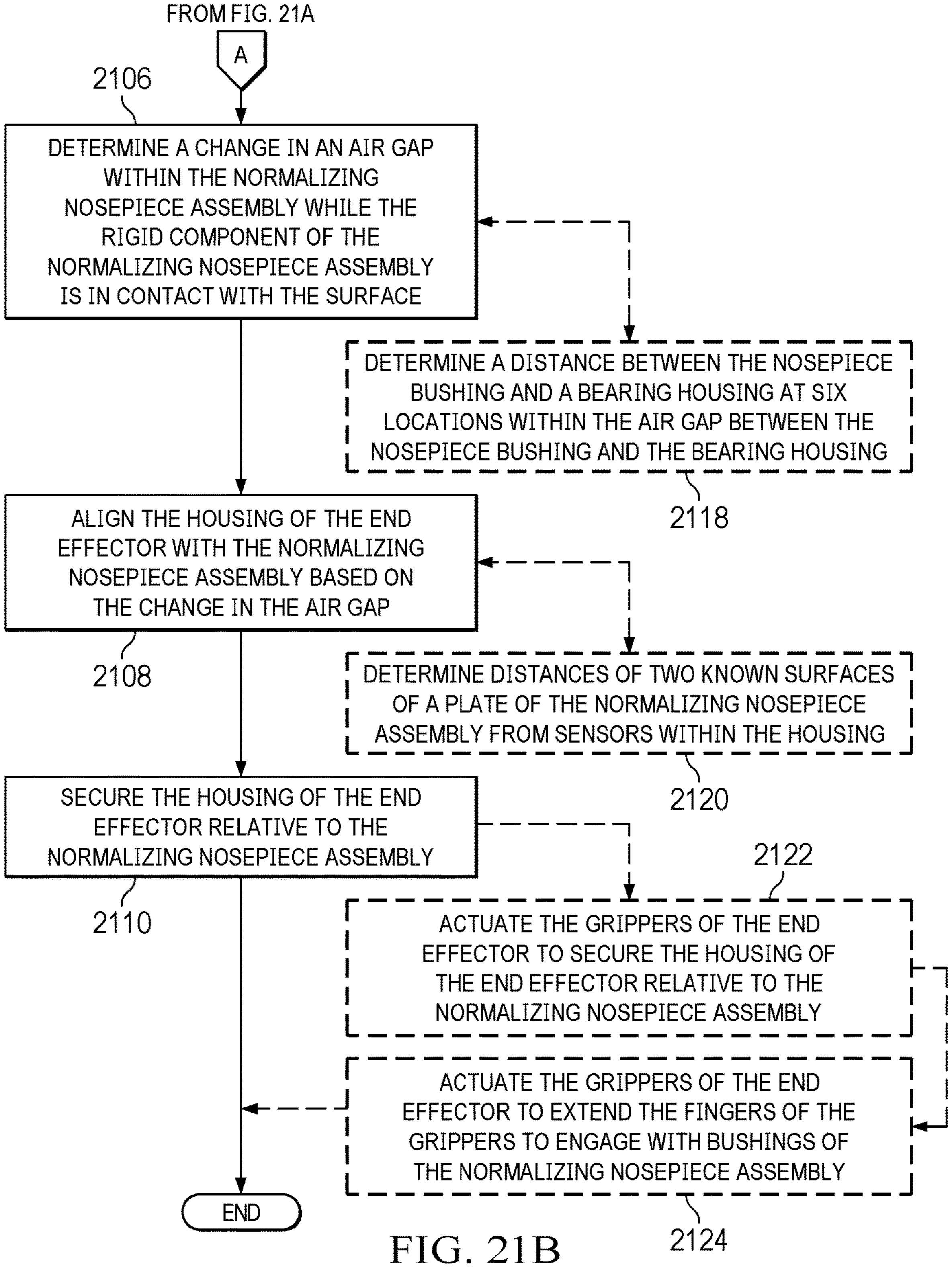

Turning to FIGS. 21A and 21B, a flowchart of a method of normalizing an end effector relative to a workpiece is depicted in accordance with an illustrative embodiment. Method 2100 can be performed using end effector 102 of FIG. 1. Method 2100 can be performed using end effector 200 of FIG. 2. Method 2100 can be performed using end effector 300 of FIGS. 3-5. Method 2100 can be performed using end effector 602 of FIGS. 6-7. Method 2100 can be performed using normalizing nosepiece assembly 802 of FIGS. 8 and 9. Method 2100 can be performed using end effector 1000 of FIGS. 10-11. Method 2100 can be performed using end effector 1204 of FIG. 12. Method 2100 can be performed using end effector 1300 of FIGS. 13-14. Method 2100 can be performed using end effector 1500 of FIG. 15. Method 2100 can be performed using end effector 1604 of FIGS. 16-19. Method 2100 can be performed using end effector 2000 of FIG. 20.

A normalizing nosepiece assembly of an end effector is released from a housing of the end effector (operation 2102). A surface of the workpiece is contacted with a rigid component of the normalizing nosepiece assembly while released from the housing (operation 2104).

A change in an air gap within the normalizing nosepiece assembly is determined while the normalizing nosepiece assembly is in contact with the surface (operation 2106). The housing of the end effector is aligned with the normalizing nosepiece assembly based on the change in the air gap (operation 2108). In some illustrative examples, the housing of the end effector is aligned with the normalizing nosepiece assembly based on the change in the air gap measured in multiple locations. In some illustrative examples, the housing of the end effector is aligned with the normalizing nosepiece assembly based on the change in the air gap measured in six locations. In some illustrative examples, the housing of the end effector is aligned with the normalizing nosepiece assembly based on the change in the air gap in combination with other measurements of the position of the normalizing nosepiece assembly. In some illustrative examples, the housing of the end effector is aligned with the normalizing nosepiece assembly based on the change in the air gap in combination with distance measurements of known surfaces of the normalizing nosepiece assembly. In some illustrative examples, the housing of the end effector is aligned with the normalizing nosepiece assembly based on the change in the air gap in combination with distance measurements of an anti-skid plate of the normalizing nosepiece assembly. The housing of the end effector is secured relative to the normalizing nosepiece assembly (operation 2110). Afterwards the method terminates.

In some illustrative examples, a compressible contact surface of the normalizing nosepiece assembly is placed in contact with the surface of the workpiece prior to releasing the normalizing nosepiece assembly from the housing (operation 2111). In some illustrative examples, grippers within the housing of the end effector are actuated to release the normalizing nosepiece assembly (operation 2112). In some illustrative examples, the grippers are actuated to retract fingers of the grippers (operation 2114).

In some illustrative examples, contacting the surface of the workpiece with a rigid component of the normalizing nosepiece assembly comprises contacting the surface with a compressible contact structure and a nosepiece bushing of the normalizing nosepiece assembly (operation 2116).

In some illustrative examples, method 2100 determines a distance between the nosepiece bushing a bearing housing at six locations within the air gap between the nosepiece bushing and the bearing housing (operation 2118). In some illustrative examples, method 2100 determines distances of two known surfaces of a plate of the normalizing nosepiece assembly from sensors within the housing (operation 2120).

In some illustrative examples, securing the housing of the end effector relative to the normalizing nosepiece assembly comprises actuating the grippers of the end effector to secure the housing of the end effector relative to the normalizing nosepiece assembly (operation 2122). In some illustrative examples, actuating the grippers of the end effector to secure the housing of the end effector comprises actuating the grippers of the end effector to extend the fingers of the grippers to engage with bushing of the normalizing nosepiece assembly (operation 2124).

Figure 22:
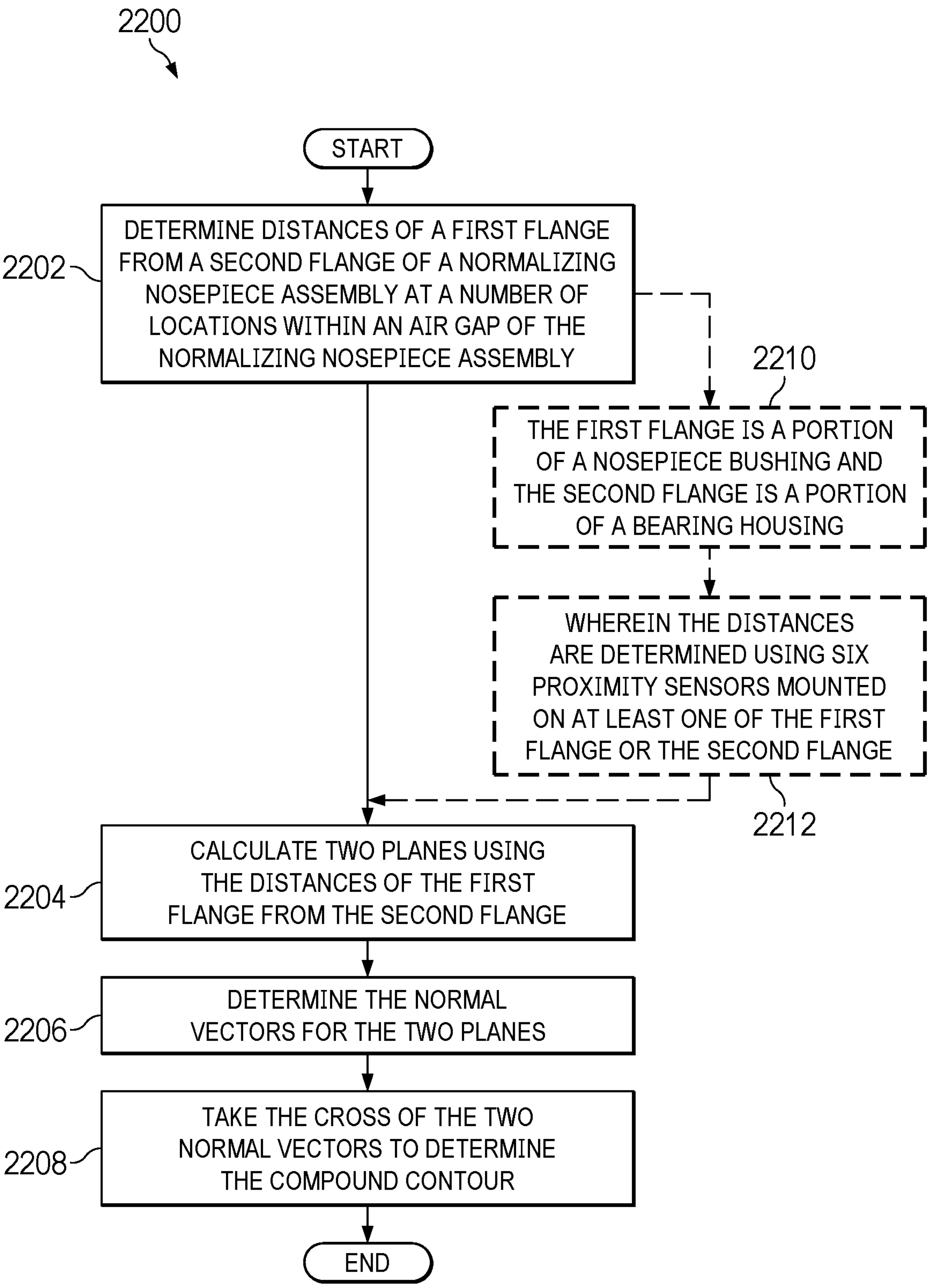
FIG. 22 is a flowchart of a method of normalizing an end effector using a nosepiece assembly in accordance with an illustrative embodiment.

Turning to FIG. 22, a flowchart of a method of normalizing an end effector using a nosepiece assembly is depicted in accordance with an illustrative embodiment. Method 2200 can be performed using end effector 102 of FIG. 1. Method 2200 can be performed using end effector 200 of FIG. 2. Method 2200 can be performed using end effector 300 of FIGS. 3-5. Method 2200 can be performed using end effector 602 of FIGS. 6-7. Method 2200 can be performed using normalizing nosepiece assembly 802 of FIGS. 8 and 9. Method 2200 can be performed using end effector 1000 of FIGS. 10-11. Method 2200 can be performed using end effector 1204 of FIG. 12. Method 2200 can be performed using end effector 1300 of FIGS. 13-14. Method 2200 can be performed using end effector 1500 of FIG. 15. Method 2200 can be performed using end effector 1604 of FIGS. 16-19. Method 2200 can be performed using end effector 2000 of FIG. 20.

Distances of a first flange from a second flange of a normalizing nosepiece assembly are determined at a number of locations within an air gap of the normalizing nosepiece assembly (operation 2202). Two planes are calculated using the distances of the first flange from the second flange (operation 2204). The normal vectors for the two planes are determined (operation 2206). The cross of the two normal vectors are taken to determine the compound contour (operation 2208). Afterwards, the method terminates.

In some illustrative examples, the first flange is a portion of a nosepiece bushing and the second flange is a portion of a bearing housing (operation 2210). In some illustrative examples, the distances are determined using six proximity sensors mounted on at least one of the first flange or the second flange (operation 2212).

Figure 23:
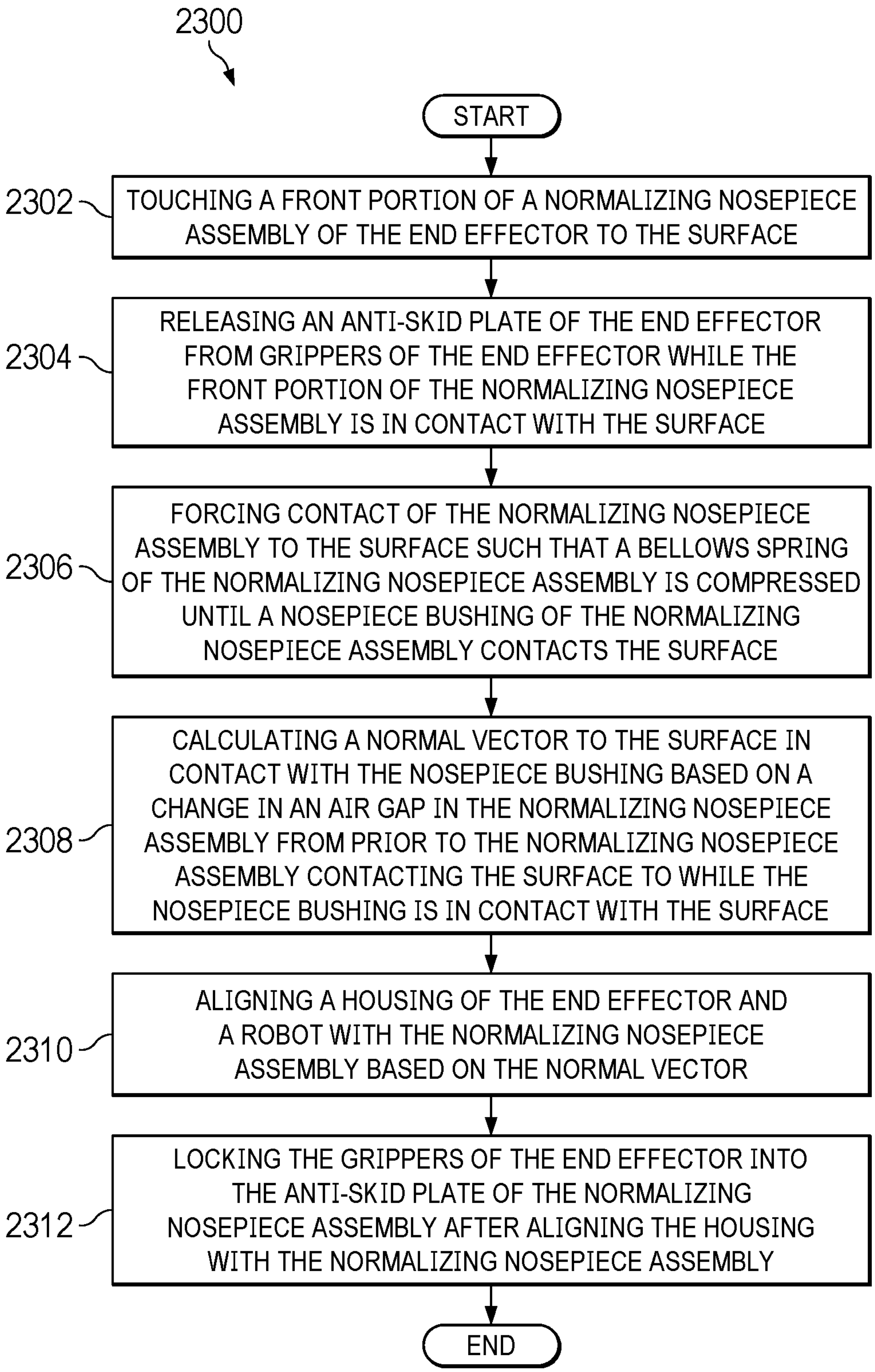
FIG. 23 is a flowchart of a method of normalizing an end effector to a surface in accordance with an illustrative embodiment.

Turning to FIG. 23, a flowchart of a method of normalizing an end effector to a surface is depicted in accordance with an illustrative embodiment. Method 2300 can be performed using end effector 102 of FIG. 1. Method 2300 can be performed using end effector 200 of FIG. 2. Method 2300 can be performed using end effector 300 of FIGS. 3-5. Method 2300 can be performed using end effector 602 of FIGS. 6-7. Method 2300 can be performed using normalizing nosepiece assembly 802 of FIGS. 8 and 9. Method 2300 can be performed using end effector 1000 of FIGS. 10-11. Method 2300 can be performed using end effector 1204 of FIG. 12. Method 2300 can be performed using end effector 1300 of FIGS. 13-14. Method 2300 can be performed using end effector 1500 of FIG. 15. Method 2300 can be performed using end effector 1604 of FIGS. 16-19. Method 2300 can be performed using end effector 2000 of FIG. 20.

A front portion of a normalizing nosepiece assembly of the end effector is touched to the surface (operation 2302). In some illustrative examples, the front portion is described as a compressible contact structure. In some illustrative examples, the front portion is part of a bellows.

Method 2300 releases an anti-skid plate of the end effector from grippers of the end effector while the front portion of the normalizing nosepiece assembly is in contact with the surface (operation 2304). Method 2300 forces contact of the normalizing nosepiece assembly to the surface such that a bellows spring of the normalizing nosepiece assembly is compressed until a nosepiece bushing of the normalizing nosepiece assembly contacts the surface (operation 2306).

Method 2300 calculates a normal vector to the surface in contact with the nosepiece bushing based on a change in an air gap in the normalizing nosepiece assembly from prior to the normalizing nosepiece assembly contacting the surface to while the nosepiece bushing is in contact with the surface (operation 2308). In some illustrative examples, additional distance sensors are present in a different portion of the end effector other than the air gap. In some illustrative examples, the data from the additional distance sensors is used in aligning the housing with the normalizing nosepiece assembly.

Method 2300 aligns a housing of the end effector and a robot with the normalizing nosepiece assembly based on the normal vector (operation 2310). Method 2300 locks the grippers of the end effector into the anti-skid plate of the normalizing nosepiece assembly after aligning the housing with the normalizing nosepiece assembly (operation 2312). Afterwards, method 2300 terminates.

As used herein, "a number of," when used with reference to items means one or more items.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 2112 through operation 2124 may be optional. As another example, operation 2210 through operation 2212 may be optional.

Figure 24:
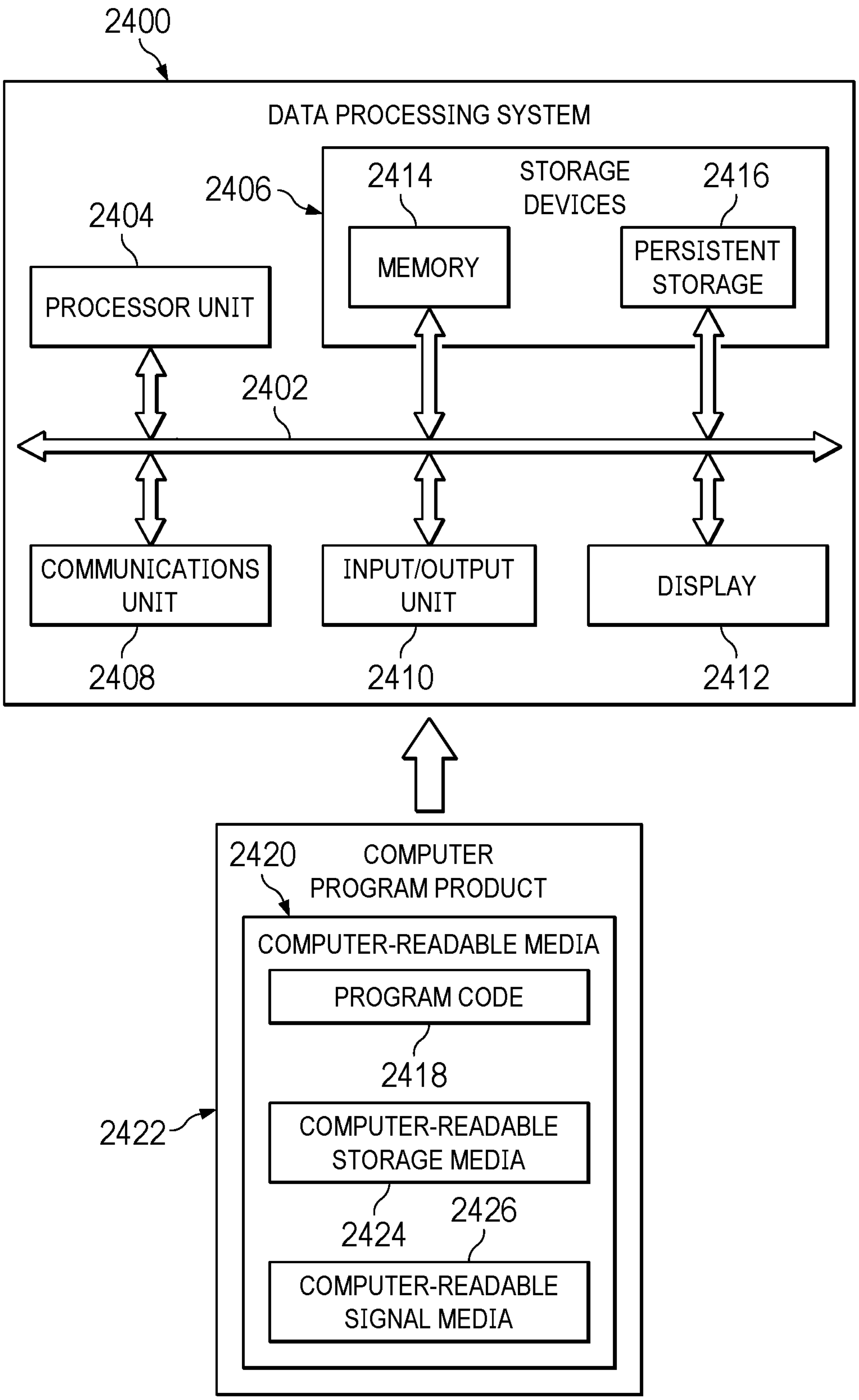
FIG. 24 is an illustration of a block diagram of a data processing system in accordance with an illustrative embodiment.

Turning now to FIG. 24, an illustration of a block diagram of a data processing system is depicted in accordance with an illustrative embodiment. Data processing system 2400 may be used to implement controller 226 or computer system 264 of FIG. 2. In this illustrative example, data processing system 2400 includes communications framework 2402, which provides communications between processor unit 2404, storage devices 2406, memory 2414, persistent storage 2416, communications unit 2408, input/output unit 2410, and display 2412. In this example, communications framework 2402 may take the form of a bus system.

Processor unit 2404 serves to execute instructions for software that may be loaded into one of storage devices 2406. Processor unit 2404 may be a number of processors, a multi-processor core, or some other type of processor, depending on the particular implementation. In an embodiment, processor unit 2404 comprises one or more conventional general-purpose central processing units (CPUs). In an alternate embodiment, processor unit 2404 comprises one or more graphical processing units (CPUs).

Memory 2414 and persistent storage 2416 are examples of storage devices 2406. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2406 may also be referred to as computer-readable storage devices in these illustrative examples. Memory 2414, in these examples, may be, for example, a random-access memory or any other suitable volatile or non-volatile storage device. Persistent storage 2416 may take various forms, depending on the particular implementation.

For example, persistent storage 2416 may contain one or more components or devices. For example, persistent storage 2416 may include a hard drive, a flash memory, a rewritable optical disk, a rewritable magnetic tape, or some combination of the above. The media used by persistent storage 2416 also may be removeable. For example, a removeable hard drive may be used for persistent storage 2416.

Storage devices 2406 are connected to the bus system. In some illustrative examples, one of storage devices 2406 stores program instructions to perform a method, such as method 2100 of FIG. 21 or method 2200 of FIG. 22. Processor unit 2404 is connected to the bus system. In some illustrative examples, processor unit 2404 executes the program instructions to receive a model of a three dimensional solid; determine at least one of vertices, edges, and faces for the model; and traverse the at least one of vertices, edges, and faces of the model to determine corresponding adjacent vertices, adjacent edges, or adjacent faces for the at least one of the vertices, the edges, and the faces such that each of corresponding adjacent vertices, corresponding adjacent edges, or corresponding adjacent faces are counted exactly once in the traverse.

Communications unit 2408, in these illustrative examples, provides for communications with other data processing systems or devices. In these illustrative examples, communications unit 2408 is a network interface card.

Input/output unit 2410 allows for input and output of data with other devices that may be connected to data processing system 2400. For example, input/output unit 2410 may provide a connection for user input through at least one of a keyboard, a mouse, or some other suitable input device. Further, input/output unit 2410 may send output to a printer. Display 2412 provides a mechanism to display information to a user.

Instructions for at least one of the operating system, applications, or programs may be located in storage devices 2406, which are in communication with processor unit 2404 through communications framework 2402. The processes of the different embodiments may be performed by processor unit 2404 using computer-implemented instructions, which may be located in a memory, such as memory 2414.

These instructions are referred to as program code, computer-usable program code, or computer-readable program code that may be read and executed by a processor in processor unit 2404. The program code in the different embodiments may be embodied on different physical or computer-readable storage media, such as storage devices 2406 including memory 2414 or persistent storage 2416.

Program code 2418 is located in a functional form on computer-readable media 2420 that is selectively removeable and may be loaded onto or transferred to data processing system 2400 for execution by processor unit 2404. Program code 2418 and computer-readable media 2420 form computer program product 2422 in these illustrative examples. In one example, computer-readable media 2420 may be computer-readable storage media 2424 or computer-readable signal media 2426.

Further, as used herein, "computer-readable media 2420" can be singular or plural. For example, program code 2418 can be located in computer-readable media 2420 in the form of a single storage device or system. In another example, program code 2418 can be located in computer-readable media 2420 that is distributed in multiple data processing systems. In other words, some instructions in program code 2418 can be located in one data processing system while other instructions in program code 2418 can be located in one data processing system. For example, a portion of program code 2418 can be located in computer-readable media 2420 in a server computer while another portion of program code 2418 can be located in computer-readable media 2420 located in a set of client computers.

The different components illustrated for data processing system 2400 are not meant to provide architectural limitations to the manner in which different embodiments can be implemented. In some illustrative examples, one or more of the components may be incorporated in or otherwise form a portion of, another component. For example, memory 2414, or portions thereof, can be incorporated in processor unit 2404 in some illustrative examples. The different illustrative embodiments can be implemented in a data processing system including components in addition to or in place of those illustrated for data processing system 2400. Other components shown in FIG. 24 can be varied from the illustrative examples shown. The different embodiments can be implemented using any hardware device or system capable of running program code 2418.

In these illustrative examples, computer-readable storage media 2424 is a physical or tangible storage device used to store program code 2418 rather than a medium that propagates or transmits program code 2418. Alternatively, program code 2418 may be transferred to data processing system 2400 using computer-readable signal media 2426.

Computer-readable signal media 2426 may be, for example, a propagated data signal containing program code 2418. For example, computer-readable signal media 2426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2400 are not meant to provide architectural limitations to the manner in which different embodiments may be implemented. The different illustrative embodiments may be implemented in a data processing system including components in addition to or in place of those illustrated for data processing system 2400. Other components shown in FIG. 24 can be varied from the illustrative examples shown. The different embodiments may be implemented using any hardware device or system capable of running program code 2418.

Figure 25:
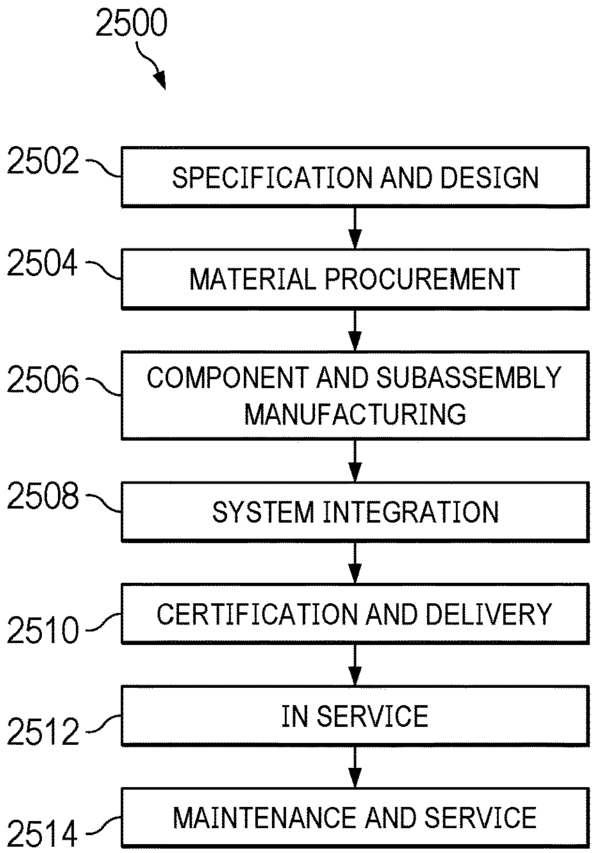
FIG. 25 is an illustration of an aircraft manufacturing and service method in a form of a block diagram in accordance with an illustrative embodiment.
Figure 26:
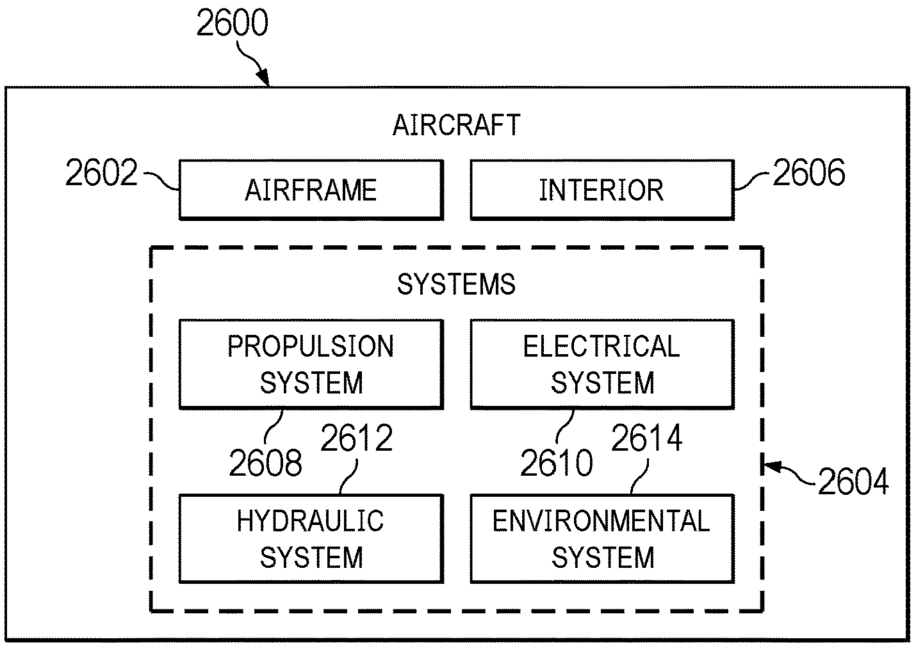
FIG. 26 is an illustration of an aircraft in a form of a block diagram in which an illustrative embodiment may be implemented.

Illustrative embodiments of the present disclosure may be described in the context of aircraft manufacturing and service method 2500 as shown in FIG. 25 and aircraft 2600 as shown in FIG. 26. Turning first to FIG. 25, an illustration of an aircraft manufacturing and service method in the form of a block diagram is depicted in accordance with an illustrative embodiment. During pre-production, aircraft manufacturing and service method 2500 may include specification and design 2502 of aircraft 2600 in FIG. 26 and material procurement 2504.

During production, component and subassembly manufacturing 2506 and system integration 2508 of aircraft 2600 takes place. Thereafter, aircraft 2600 may go through certification and delivery 2510 in order to be placed in service 2512. While in service 2512 by a customer, aircraft 2600 is scheduled for routine maintenance and service 2514, which may include modification, reconfiguration, refurbishment, or other maintenance and service.

Each of the processes of aircraft manufacturing and service method 2500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 26, an illustration of an aircraft in the form of a block diagram is depicted in which an illustrative embodiment may be implemented. In this example, aircraft 2600 is produced by aircraft manufacturing and service method 2500 of FIG. 25 and may include airframe 2602 with plurality of systems 2604 and interior 2606. Examples of systems 2604 include one or more of propulsion system 2608, electrical system 2610, hydraulic system 2612, and environmental system 2614. Any number of other systems may be included.

Apparatuses and methods embodied herein may be employed during at least one of the stages of aircraft manufacturing and service method 2500. One or more illustrative embodiments may be used during component and subassembly manufacturing 2506, system integration 2508, in service 2512, or maintenance and service 2514 of FIG. 25. For example, end effector 200 can be used to perform operations on a workpiece to form a component of one of airframe 2602 or interior 2606. As another example, end effector 200 can be used to perform operations on a workpiece during component and subassembly manufacturing 2506. As yet another example, end effector 200 can be used to perform rework or maintenance operations on a workpiece during maintenance and service 2514. Method 2100 or method 2200 can be performed to normalize an end effector prior to performing an operation on a workpiece in component and subassembly manufacturing 2506. Method 2100 or method 2200 can be performed to normalize an end effector prior to performing an operation on a workpiece in maintenance and service 2514.

The illustrative examples enable robotic end effectors to normalize over compound contoured surfaces. Previously existing normalizing nosepiece assemblies can only perform normalization with respect to simple contours. The illustrative examples removes the use of complex spherical joint hardware used in conventional anti-skidding mechanisms that reduce the reliability of the end effector and can cause extensive maintenance.

The illustrative examples provide a contact based normalizing nosepiece assembly for a single function end effector attached to a robot. The end effector can be used for drilling, inspection, or fastening on a workpiece, such as an aircraft structure. The nosepiece contacts the surface of a workpiece and can swivel, changing the air gap between a flange of the nosepiece and a flange of a bearing housing. Six proximity sensors are positioned in the air gap. The change in air gap is sensed and used to establish one or two planes parallel to the simple or compound workpiece. The vector normal to these planes are then used to calculate and position the nosepiece assembly normal to the workpiece.

The illustrative examples provide a compressible contact structure. The compressible contact structure is a nosepiece component in the front. The compressible contact structure can be made of a polymeric material. The compressible contact structure can be made of a polyurethane. The compressible contact structure can take the form of a bellows spring with a radial polyurethane contact area that touches the workpiece. The compressible contact structure encloses a hollow cylinder of a non-metallic nosepiece bushing that contacts the workpiece and aligns to the contour of the workpiece to maintain normality between the nosepiece component and the workpiece. The flexibility of the compressible contact structure and front contact area provide compliance for the nosepiece component as it touches a simple or compound contour surface.

Proximity sensors are integrated into the nosepiece assembly. The front nosepiece component touches the workpiece and moves based on the contact. A flange attached to the front nosepiece component moves in compliance, which changes the air gap containing the proximity sensors. This change in air gap is measured by the proximity sensors and the data is used to define one or two planes from which the surface normals are computed.

A number of sets of magnets are provided with magnets attached within the air gap next to the proximity sensors. Magnets are attached to the flange of the front nosepiece component. The magnetic fields between the sets of magnets helps provide the compliance motion for the flange attached to the front nosepiece component.

A magnetic bearing is provided at the back of the nosepiece assembly between the anti-skid plate and the cover plate of the end effector. The magnetic field between these sets of magnets provides the compliance for the anti-skid plate and the cover plate.

Gripper mechanisms are provided at the back of the nosepiece assembly. These gripper mechanisms lock the nosepiece assembly to the end effector structure once normality has been achieved with the usage of the front nosepiece component and the proximity sensors. The illustrative examples provide the ability to normalize on compound contour surfaces. The use of magnetic fields to provide compliance of components provides reliability in comparison to using standard springs for compliance.

The illustrative examples provide a method to normalize an end effector nose piece to a surface. The front portion of a normalizing nosepiece assembly is placed in contact with an OML (outer mold line) of a workpiece. The anti-skid plate is released from grippers. A compressible contact structure is pressed to the surface contour of the workpiece. The nosepiece bushing is placed into contact with the workpiece. A change in air gap between two normalizing planes is determined using six sensors aided by a magnetic bearing. A normal vector to the surface in contact with the nose piece is calculated.

The cover plate and robot are aligned with the normalized nosepiece assembly assisted by a magnetic bearing and 2 distance sensors. In some illustrative examples the distance sensors are laser sensors. The grippers of the end effector are locked into the anti-skid plate attached to nosepiece assembly.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An end effector comprising:

a housing;

an actuated mechanical retainer connected to the housing and configured to selectively constrain and release a normalizing nosepiece assembly from the housing; and the normalizing nosepiece assembly moveable relative to the housing and having a nosepiece bushing configured to contact a workpiece, wherein the normalizing nosepiece assembly comprises an air gap that changes shape as the normalizing nosepiece assembly moves relative to the housing, and wherein the normalizing nosepiece assembly further comprises proximity sensors in the air gap.

2. The end effector of claim 1, wherein the normalizing nosepiece assembly further comprises a magnetic bearing in the air gap.

3. The end effector of claim 1, further comprising:

distance sensors mounted to the housing and configured to detect movement of at least a portion of the normalizing nosepiece assembly relative to the housing.

4. A method of normalizing an end effector relative to a workpiece, the method comprising:

releasing a normalizing nosepiece assembly of an end effector from a housing of the end effector;

contacting a surface of the workpiece with a rigid component of the normalizing nosepiece assembly while released from the housing;

determining a change in an air gap within the normalizing nosepiece assembly while the normalizing nosepiece assembly is in contact with the surface;

aligning the housing of the end effector with the normalizing nosepiece assembly based on the change in the air gap; and securing the housing of the end effector relative to the normalizing nosepiece assembly.

5. The method of claim 4, wherein:

releasing the normalizing nosepiece assembly of the end effector comprises actuating grippers within the housing of the end effector to release the normalizing nosepiece assembly; and actuating the grippers comprises actuating the grippers to retract fingers of the grippers.

6. The method of claim 4 further comprising:

wherein contacting the surface of the workpiece with the rigid component of the normalizing nosepiece assembly comprises contacting the surface with a compressible contact structure and nosepiece bushing of the normalizing nosepiece assembly.

7. The method of claim 6 further comprising:

determining a distance between the nosepiece bushing and a bearing housing at six locations within the air gap between the nosepiece bushing and the bearing housing.

8. The method of claim 4 further comprising:

determining distances of two known surfaces of a plate of the normalizing nosepiece assembly from sensors within the housing.

9. The method of claim 4, wherein:

securing the housing of the end effector relative to the normalizing nosepiece assembly comprises actuating grippers of the end effector secure the housing of the end effector relative to the normalizing nosepiece assembly; and actuating the grippers of the end effector comprises actuating the grippers of the end effector to extend fingers of the grippers to engage with bushings of the normalizing nosepiece assembly.

10. A method for normalizing an end effector using a normalizing nosepiece assembly, the method comprising:

determining distances of a first flange from a second flange of a normalizing nosepiece assembly at a number of locations within an air gap of the normalizing nosepiece assembly;

calculating two planes using the distances of the first flange from the second flange;

determining normal vectors for the two planes; and taking a cross of the two normal vectors to determine a compound contour.

11. The method of claim 10, wherein the first flange is a portion of a nosepiece bushing and the second flange is a portion of a bearing housing.

12. The method of claim 10, wherein the distances are determined using six proximity sensors attached to at least one of the first flange or the second flange.

13. An end effector comprising:

a housing;

a normalizing nosepiece assembly comprising:

a nosepiece bushing;

a compressible contact structure connected to the nosepiece bushing;

a magnetic bearing within an air gap between the nosepiece bushing and a bearing housing; and an anti-skid plate connected to the bearing housing; and an actuated mechanical retainer configured to release the normalizing nosepiece assembly from the housing.

14. The end effector of claim 13 further comprising:

a plurality of fasteners connected to a face of the housing and extending through oversized holes of the anti-skid plate.

15. The end effector of claim 13 wherein the actuated mechanical retainer comprises grippers connected to the housing and extending through bushings of the normalizing nosepiece assembly.

16. The end effector of claim 13 wherein the magnetic bearing comprises a number of attracting magnet sets and a number of repelling magnet sets.

17. The end effector of claim 13 further comprises a magnetic bearing between the anti-skid plate and a face of the housing.

18. The end effector of claim 13 further comprising:

proximity sensors within the air gap.

19. The end effector of claim 13, wherein the compressible contact structure comprises a polymeric material.

20. The end effector of claim 13, wherein the compressible contact structure is a bellows.

21. A method to normalize an end effector to a surface, comprising:

touching a front portion of a normalizing nosepiece assembly of the end effector to the surface;

releasing an anti-skid plate of the end effector from grippers of the end effector while the front portion of the normalizing nosepiece assembly is in contact with the surface;

forcing contact of the normalizing nosepiece assembly to the surface such that a bellows spring of the normalizing nosepiece assembly is compressed until a nosepiece bushing of the normalizing nosepiece assembly contacts the surface;

calculating a normal vector to the surface in contact with the nosepiece bushing based on a change in an air gap in the normalizing nosepiece assembly from prior to the normalizing nosepiece assembly contacting the surface to while the nosepiece bushing is in contact with the surface;

aligning a housing of the end effector and a robot with the normalizing nosepiece assembly based on the normal vector; and locking the grippers of the end effector into the anti-skid plate of the normalizing nosepiece assembly after aligning the housing with the normalizing nosepiece assembly.

* * * * *